(12) United States Patent
Koga

(10) Patent No.: US 7,313,699 B2
(45) Date of Patent: Dec. 25, 2007

(54) AUTOMATIC AUTHENTICATION METHOD AND SYSTEM IN PRINT PROCESS

(75) Inventor: Hiroshi Koga, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 876 days.

(21) Appl. No.: 09/987,833

(22) Filed: Nov. 16, 2001

(65) Prior Publication Data

US 2002/0062453 A1    May 23, 2002

(30) Foreign Application Priority Data

Nov. 17, 2000  (JP)  ............... 2000-351064
Nov. 14, 2001  (JP)  ............... 2001-348648

(51) Int. Cl.
  H04L 9/00   (2006.01)
  H04L 9/32   (2006.01)
  H04K 1/00   (2006.01)
  G06F 7/04   (2006.01)
  G06F 17/30  (2006.01)
  G06K 9/00   (2006.01)
  H03M 1/68   (2006.01)

(52) U.S. Cl. .............. 713/170; 713/164; 713/182; 713/183; 726/2; 726/26; 726/27; 726/28

(58) Field of Classification Search ............... 713/170, 713/182
See application file for complete search history.

(56) References Cited

U.S. PATENT DOCUMENTS 5,675,782 A * 10/1997 Montague et al. ............. 726/4
6,163,383 A * 12/2000 Ota et al. ..................... 358/1.1
6,313,921 B1 * 11/2001 Kadowaki .................. 358/1.15
6,711,677 B1 *  3/2004 Wiegley ...................... 713/151
6,795,205 B1 *  9/2004 Gacek ........................ 358/1.15

FOREIGN PATENT DOCUMENTS

| JP | 02 059963   | 2/1990 |
| JP | 09-048165   | 2/1997 |
| JP | 09-185474   | 7/1997 |
| JP | 10-207661   | 8/1998 |
| JP | 2000-035871 | 2/2000 |

* cited by examiner

Primary Examiner—Benjamin E. Lanier
(74) Attorney, Agent, or Firm—Fitzpatrick, Cella, Harper & Scinto

(57) ABSTRACT

This invention provides an automatic authentication method and system in a print process, which can obviate the need for user's input operations of the user ID and password and can improve security since authentication is automatically done based on print information embedded in a file or information from an application program without any user's input.

In a print process that requires user authentication, a printer driver extracts information related to an application and/or a document for the print process as attribute information, and user authentication is made by comparing the attribute information with information stored in a user registration information database of a server. If user authentication has succeeded, the printer driver controls a printer to print, and the server manages and stores accounting information and the like for respective departments in a department management information database.

16 Claims, 15 Drawing Sheets

AUTOMATIC AUTHENTICATION METHOD AND SYSTEM IN PRINT PROCESS

FIELD OF THE INVENTION

The present invention relates to a print control method and system and, more particularly, to a print control method and system which pertain to user authentication in a print process by a printer.

BACKGROUND OF THE INVENTION

A department management authentication system in a print process by a conventional printer normally uses the following method.

(1) When cost for expendables in a document processes by a printer, cost for the use time of the printer, and the like are managed for respective users or departments such as affiliations and the like, department authentication requires a user who executes a print process to input a user ID and password in advance at the beginning of the print process.

(2) Upon executing a document print process by the printer, to do a secured print process that requires security, a user is required to input his or her user ID and password on the user interface of a printer driver on a host system in advance and to again input the same user ID and password on the control panel of a printer at the beginning of the print process.

(3) It is a common practice to input the user ID and password for each print job.

For example, in Japanese Patent Laid-Open No. 10-207661, a user name, group name, and password are appended as a header of print instruction data which is sent to a printer. When the user sets "user name", "group name", and "password" (authentication data) on a driver window, and instructs to start a print process from an application, the data is transferred to the printer, and a management system controller of the printer interprets the header to confirm the user name, group name, and password. The controller compares a user name list of registered users who can use the printer, and the user name in the data to check if the user is authentic.

Recently, it is required to manage a using status of a printer in accordance to each of users or departments. However, in the prior system, it is not possible to manage the using status in accordance to each of applications. For example, it is impossible to change a user or department when the user or department executes a print process via a specific application, or to prohibit a user or department from executing a print process via a specific application.

Also, in the prior art, when user authentication is made in a print process by the printer, the following problems are posed.

(1) Since department authentication or user authentication is done by making each user who executes a print process input his or her user ID and password in advance and again at the beginning of the print process, the user ID or password is likely to be leaked to a third party.

(2) Since the user ID and password are input for each print job, complicated user authentication operation is required.

(3) It is impossible for an external authentication apparatus to recognize a name of application instructing an execute of a print process, which name is used for management or limitation of the print process, without complicated operation, when a user or department executes the print process using data formed via a specific application.

SUMMARY OF THE INVENTION

The present invention has been made in consideration of the above prior arts, and has as its object to provide an arrangement for a user authentication before start of print without complicated manual operation by user.

The present invention has as its another object to provide an arrangement for a charging or limiting of use process based on as used authentication using a name of application instructing an execute of a print process.

The present invention has as its further another object to provide an automatic authentication method and system in a print process which can obviate the need for user's ID and password input operations and can improve security by automatically making authentication based on print information embedded in a file or information of an application program independently of user's inputs.

For example, upon making accounting management for respective departments in association with print processes by a printer, in a print accounting process for cost for expendables in print processes and cost for the use time of the printer, user authentication is automatically done on the basis of various kinds of document attribute information including at least one of a document name, application name, document creator or updater, affiliation of the document creator or updater, password, create/update date, and the like from an application that creates and outputs a document, thus maintaining high security and improving operability upon authentication.

For example, upon executing a secured print process by a printer, information required for user authentication is sent from a printer driver on the basis of various kinds of document attribute information including at least one of a document name, application name, document creator or updater, affiliation of the document creator or updater, password, create/update date, and the like, which are output from an application that issues a document print instruction and are associated with a document to be printed, and user authentication is automatically done, thus maintaining high security, and improving operability by obviating the need for user operations associated with user authentication.

For example, upon making accounting management for respective departments in association with print processes by a printer, in a print accounting process for cost for expendables in print processes and cost for the use time of the printer, user authentication is automatically done on the basis of various kinds of application attribute information including at least one of an application name, application user, affiliation of the application user, password, use date, and the like that pertain to an application which creates and outputs a document, thus maintaining high security and improving operability upon authentication. In addition, calculation and accounting processes of application and printer use states are made for respective departments such as personal users, groups, affiliations, and the like.

To solve the above problems, an automatic authentication method in a print process according to the present invention is an automatic authentication method in a print process that requires user authentication, comprising the steps of: extracting information related to an application and/or a document for the print process as attribute information; and executing user authentication based on the attribute information.

The attribute information contains various kinds of document attribute information including at least one of a document name, application name, document creator/updater, affiliation of the document creator/updater, password, create/ update date, and the like, which are associated with a document print process. The method further comprises the step of executing, when user authentication has succeeded and a print process is executed, an accounting process of expendables and the like associated with the document print process for each user or each department of a group to which the user belongs. The attribute information contains various kinds of application attribute information including at least one of an application name, application user, affiliation of the application user, password, use date, and the like, which are associated with the application used. The method further comprises the step of executing, when user authentication has succeeded and a print process is executed, an accounting process associated with use of the application for each user or each department of a group to which the user belongs. User authentication is executed by comparing an ID and password found based on the attribute information, and an ID and password that a user inputs to a printer.

An automatic authentication system according to the present invention is an automatic authentication system in a print process that requires user authentication, comprising: means of extracting information related to an application and/or a document for the print process as attribute information; and means of executing user authentication based on the attribute information.

The attribute information contains various kinds of document attribute information including at least one of a document name, application name, document creator/updater, affiliation of the document creator/updater, password, create/update date, and the like, which are associated with a document print process. The automatic authentication system comprises a client computer or print server which is installed with a printer driver, a server for managing a network, and a printer for executing the print process, which are connected via a network, and the extraction means is included in the printer driver, and the user authentication means is included in the server. The system further comprises means of, when user authentication has succeeded and a print process is executed, executing an accounting process of expendables and the like associated with the document print process for each user or each department of a group to which the user belongs. The attribute information contains various kinds of application attribute information including at least one of an application name, application user, affiliation of the application user, password, use date, and the like, which are associated with the application used. The system further comprises means of, when user authentication has succeeded and a print process is executed, executing an accounting process associated with use of the application for each user or each department of a group to which the user belongs. The automatic authentication system comprises a client computer or print server which is installed with a printer driver, and a printer for executing the print process, which are connected via a network, and the extraction means is included in the printer driver, and the user authentication means is included in the printer. The user authentication means compares an ID and password found based on the attribute information, and an ID and password that a user inputs to a printer.

A printer driver according to the present invention is a printer driver in an automatic authentication system which executes a print process that requires user authentication, comprising: means of receiving information related to an application and/or a document as attribute information for the print process; means of extracting information required for user authentication from the attribute information; means of sending a user authentication request appended with the extracted information to a server via a network; and means of, when user authentication has succeeded, controlling a printer to execute the print process.

Also, a printer driver according to the present invention is a printer driver in an automatic authentication system which executes a print process that requires user authentication, comprising: means of receiving information related to an application and/or a document for the print process as attribute information; means of extracting information required for user authentication from the attribute information; and means of sending print information appended with the extracted information to a printer.

A server according to the present invention is a server in an automatic authentication system which executes a print process that requires user authentication, comprising: means of receiving information, which is required for user authentication and is extracted from attribute information related to an application and/or a document for the print process, from a printer driver via a network; means of checking a user authentication result by comparing the extracted information with user authentication information which is registered in advance; and means of returning the user authentication result to the printer driver via the network.

The user authentication information which is registered in advance contains related information of a user and a department of a group to which the user belongs, and the server further comprises means of, when user authentication has succeeded and a print process is executed, executing an accounting process of expendables and the like associated with the document print process for each user or each department of the group to which the user belongs. The user authentication information which is registered in advance contains related information of a user and a department of a group to which the user belongs, and the server further comprises means of, when user authentication has succeeded and a print process is executed, executing an accounting process associated with use of the application for each user or each department of the group to which the user belongs. The server further comprises: means of registering and holding various kinds of attribute information of departments, affiliations, individuals, print accounting states, and the like associated with clients, users, and groups who make a document print process; and means of updating use states of a printer used in a print process for respective departments, affiliations, and individuals. The attribute information contains various kinds of document attribute information including at least one of a document name, application name, document creator/updater, affiliation of the document creator/updater, password, create/update date, and the like, which are sent from a print server or client and are associated with a document print process, and the checking means comprises means of executing department authentication of a user, group, affiliation, or the like by comparing a document creator/updater, affiliation of the document creator/updater, and password registered in the server on the basis of the various kinds of document attribute information. The attribute information contains various kinds of application attribute information including at least one of an application name, application user, affiliation of the application user, password, use date, and the like, which are associated with the application used, and the checking means comprises means of granting permission of use of the application on the basis of the application attribute information.

A printer according to the present invention is a printer in an automatic authentication system which executes a print process that requires user authentication, comprising: means of receiving information, which is required for user authentication and is extracted from attribute information related to an application and/or a document for the print process, from a printer driver together with print information; means of inputting user authentication information; and means of executing user authentication on the basis of a comparison result of the information required for user authentication and the input information.

A storage medium according to the present invention is a storage medium which computer-readably stores a printer driver in an automatic authentication system which executes a print process that requires user authentication, the printer driver comprising: the step of receiving information related to an application and/or a document for the print process as attribute information; the step of extracting information required for user authentication from the attribute information; the step of sending a user authentication request appended with the extracted information to a server via a network; and the step of controlling, when user authentication has succeeded, a printer to execute the print process.

Also, a storage medium according to the present invention is a storage medium which computer-readably stores a printer driver in an automatic authentication system which executes a print process that requires user authentication, the printer driver comprising: the step of receiving information related to an application and/or a document for the print process as attribute information; the step of extracting information required for user authentication from the attribute information; and the step of sending print information appended with the extracted information to a printer.

Furthermore, a storage medium according to the present invention is a storage medium which computer-readably stores a control program for controlling a printer in an automatic authentication system which executes a print process that requires user authentication, the control program comprising: the step of receiving information, which is required for user authentication and is extracted from attribute information related to an application and/or a document for the print process, from a printer driver together with print information; the step of inputting user authentication information; and the step of executing user authentication on the basis of a comparison result of the information required for user authentication and the input information.

As described above, the object of the present invention is achieved under the condition of the system arrangement of a system which forms a communication network between a host system that serves as a server for managing clients and print server, which are connected via a line on the basis of a network communication protocol, and various programs and data, and host systems serving as clients including the print server, and a printer shared under the management of the print server.

Various kinds of document attribute information including at least one of a document name, application name, document creator/updater, affiliation of the document creator/updater, password, create/update date, and the like in a document create/output application on a client are sent to a printer control program on a print server or client via an application interface (API) upon a document print process.

Upon receiving such various kinds of document attribute information, a printer driver on the print server or client sends a user authentication request to the server on the basis of the received document attribute information prior to print control for outputting a document.

User authentication is done based on department information managed on the server, and the authentication result is sent to the print server or client. If authentication has succeeded, department management process such as an accounting process or the like is executed.

On the other hand, the printer driver on the print server or client comprises an arrangement and processes for executing a print control process on the basis of a document print instruction, and printing a target document from a target printer.

Upon receiving various kinds of document attribute information mentioned above via the API, the printer driver analyzes and generates information required for user authentication in a secured print process, and sends that generated information to the printer together with a document print control command.

The printer comprises an arrangement and processes for making user authentication based on a user ID or password input at its control panel, and printing a target document if authentication has succeeded.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Preferred embodiments of the present invention will be described in detail hereinafter with reference to the accompanying drawings.

First Embodiment

Outline of Operation Example in this Embodiment

In this example, in a system constituted by a client connected to a server based on a network communication protocol, a host computer of a print server, and a printer connected to and shared by them, a print instruction is issued from the client to a target printer to print.

In response to this instruction, a printer control program (printer driver) on the host computer receives various kinds of document attribute information such as a document name, application name, document creator or updater, affiliation of the document creator or updater, password, create/update date, and the like via an application interface on the basis of a document print instruction from an application on the host computer as a client, and issues a user authentication request to the server.

The server sends the user authentication result to the print server or client, enters a document print process, and executes an accounting control process as an example of department management.

The printer driver which resides on a program memory of the host computer and is associated with the printer controls a target printer to print a document on the basis of various kinds of attribute setup information for a print process and figure/text and image rendering data.

Example of Arrangement of Automatic Authentication System in Print Process of this Embodiment

Example of System Arrangement

Figure 1:
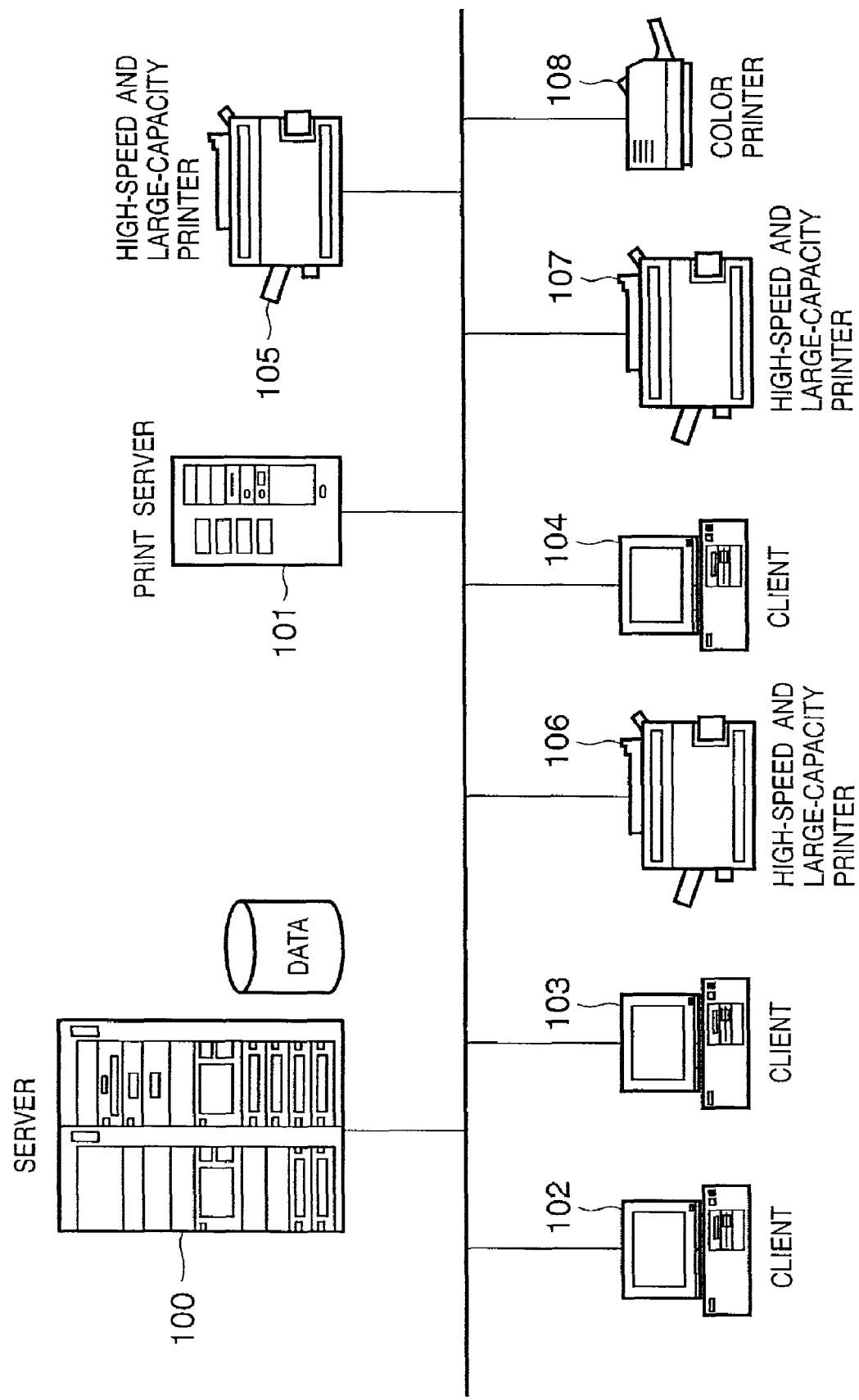
FIG. 1 is a diagram showing the basic arrangement of an automatic authentication system in a print process according to an embodiment of the present invention.

FIG. 1 shows an example of the basic arrangement of a system common to embodiments of the present invention.

In a system in which a server 100, at least one print server 101, clients 102 to 104 comprising workstations, personal computers, and the like, printers 105 to 108 are connected via a communication line, a network is built to have the server 100 as a core on the basis of an operating system and communication protocol.

In this system, each of the workstations or personal computers 102 to 104 serving as clients issues a print instruction of a document created and saved by an application program on each client to one of various printers 105 to 108 shared under the management of the print server 101, thus controlling that printer to print out the document.

At this time, the application program sends various kinds of document attribute information such as a document name, application name, document creator or updater, affiliation of the document creator or updater, password, create/update date, and the like to a printer driver on a host system serving as the print server 101 or one of the clients 102 to 104 in response to the document print instruction via an application program interface (API).

The printer driver on the host system which serves as the print server 101 or one of the clients 102 to 104 receives various kinds of document attribute information via the API, and selects and sends required information on the basis of such various kinds of document attribute information so as to identify a department such as a user, group, affiliation, or the like that pertains to a person who executes a document print process, thus sending a user authentication request to the server 100.

API is provided between an application and a printer driver and may be as a part of OS functions. However, in the present invention, API for obtaining file attributes from applications is provided in the printer driver side. The printer driver calls the API to obtain an application name and the like from the application as attribute information.

A user authentication program on the server 100 executes an authentication process on the basis of the document attribute information received from the printer driver on the host system which serves as the print server 101 or one of the clients 102 to 104, and sends the authentication result to the printer driver.

The printer driver on the print server 101 or one of the clients 102 to 104 receives the user authentication result from the server 100, and enters a document print process if it is determined that the user is authentic. Then, the printer driver generates output attribute information which includes a paper size, paper type, the number of copies, color/monochrome print mode, and the like used in a print control process on the basis of various print attribute setups input in a print instruction mode, and sends that information to the server 100 that executes a print accounting control process.

Furthermore, the printer driver on a program memory of the host system which serves as the print server 101 or one of the clients 102 to 104 generates a print control command of a target printer on the basis of the print attribute setups, and controls the target printer to print out a requested document.

On the other hand, the server 100 executes an accounting process associated with that print process on the basis of the output attribute information from one of the print server 101 and clients 102 to 104.

Example of Connection Arrangement of Host System and Printer

An example of the connection arrangement of the host system and printer of this embodiment will be explained below with reference to FIG. 2.

A host system 300 serving as one of the clients 102 to 104 or print server 101 comprises an input device 301 such as a keyboard, mouse, or the like for making inputs to the system, a display 302 for displaying data, a disk 303 for inputting/outputting files, and a printer 312 connected to the host system 300. In this system, the host system 300 controls the printer 312 to output a document on the basis of a print instruction from a printer control program which resides on a program memory (RAM) 306 in the host system 300 and executes print control for a document print process from a client to the printer.

The arrangement of the host system 300 will be described in detail below using FIG. 2.

Reference numeral 304 denotes a CPU for controlling the host system and input/output devices connected thereto, executing a series of processes such as output control and the like and various programs in accordance with input instructions; and 305, a ROM that stores various basic programs such as a BIOS and the like for operating the CPU 304.

Reference numeral 306 denotes a RAM used as a work area for various processes on which the CPU 304 executes/runs various print attribute setups associated with the printer, overlay print process, printer driver, and the like. Also, an operating system, information that pertains to an external document output process to the printer driver and printer 312, an application program used to input instructions, and to issue a print instruction, and the like are allocated on this RAM.

Reference numeral 307 denotes a keyboard controller comprising an interface for the input device 301 such as a keyboard, mouse, or the like, which is connected to the host system 300, and is used to make various external inputs; 308, a display controller comprising an interface for displaying data on the display 302; and 309, a disk controller comprising an input/output interface to the disk 303. Reference numeral 310 denotes an interface which comprises a communication protocol used to connect the host system 300 and printer 312 and to make communications, and inputs/outputs data via a network line such as the Ethernet or the like. Reference numeral 311 denotes a CPU bus for connecting the respective building components of the host system.

The arrangement of the printer 312 will be described in detail below.

Reference numeral 314 denotes a CPU for controlling various input/output devices connected to the printer, and executing a series of processes such as print control and programs such as a communication control process and the like in accordance with input instructions; 315, a ROM that stores programs used to control the printer to execute a series of processes such as control processes of respective input/output devices, communication control process, print control according to an input instruction, and the like, a control command interpretation process, and the like, various data, and so forth; and 316, a RAM used as a work area for the CPU 314 to execute various programs and processes. Reference numeral 317 denotes an interface which comprises a communication protocol used to connect the host system 300 and printer 312 and to make communications, and inputs/outputs data via a network line such as the Ethernet or the like. Reference numeral 318 denotes a disk controller which comprises an input/output interface with a disk 313 that stores various data and the like in the ROM 315; and 319, a video interface for outputting a given pattern, i.e., an engine control processor that comprises an input/output interface for exchanging data and signals with a printer driving system (engine) 321. Reference numeral 320 denotes a CPU bus for connecting the respective building components of the printer.

Figure 3:
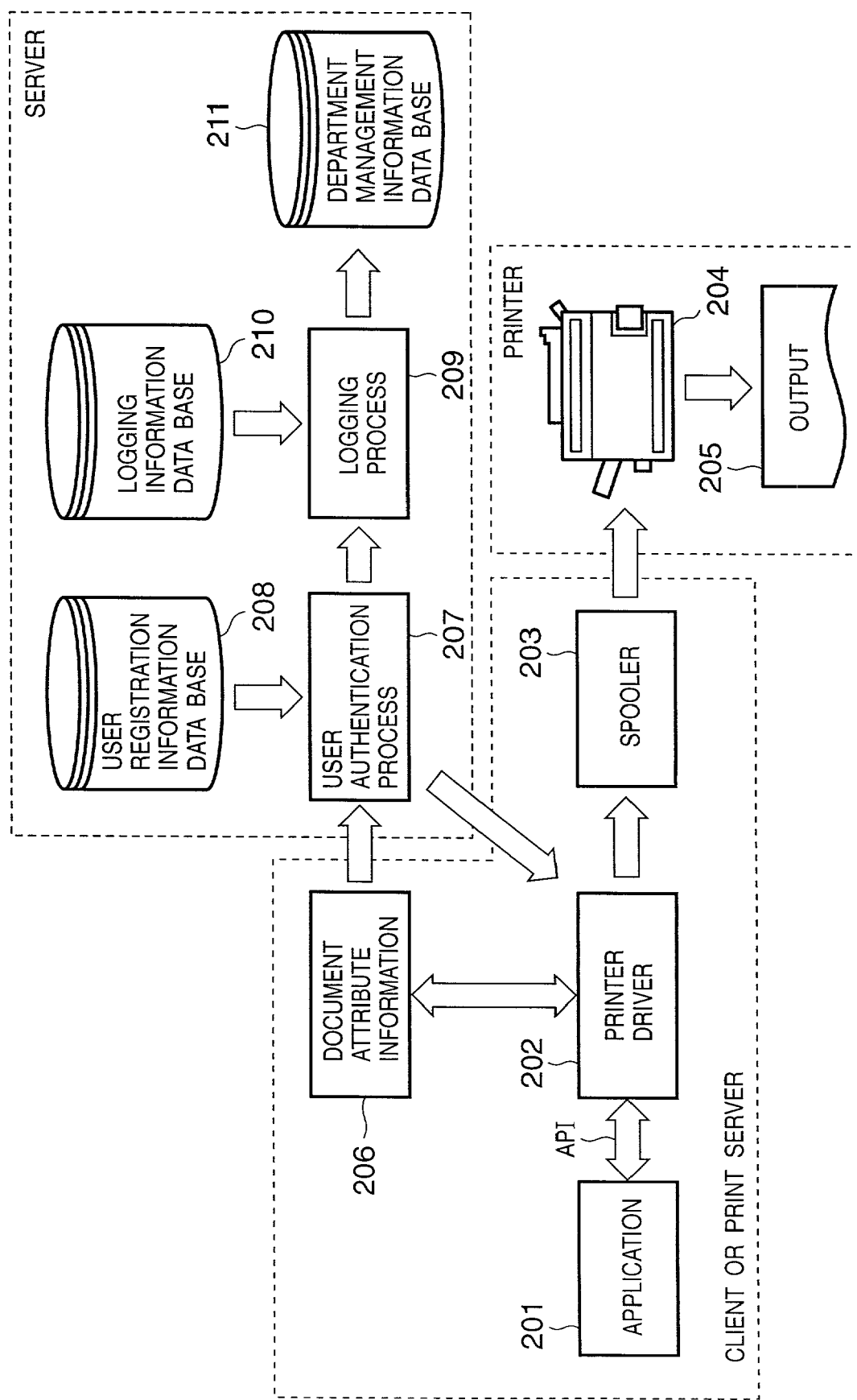
FIG. 3 is a block diagram showing the flow of data according to the first embodiment.

Example of Operation of Automatic Authentication System in Print Process of this Embodiment Operation Example of System FIG. 3 is an example of the arrangement that shows control processes and the flow of control in respective building components of the network constituted by the server, clients, and printers shown in FIG. 1.

The user creates and saves a document using an application 201 on one of the clients 102 to 104. In this case, various kinds of document attribute information such as a document name, application name, document creator or updater, affiliation of the document creator or updater, password, create/update date, and the like are input manually by the user or automatically by an application program process.

Also, using application 201, the user makes various attribute setups for a print process to a printer driver 202 on one of the clients 102 to 104 or print server 101, and issues a document print instruction.

At the same time, the application 201 sends various kinds of document attribute information, which are input upon creating/saving a document, to the printer driver 202 via an application interface (API). In this case, various kinds of document attribute information are sent in the form of parameters or data mapped on a program memory using the API.

The printer driver 202 on one of the clients 102 to 104 or print server 101 extracts information required to authenticate the user who executes a document print process on the basis of the document attribute information sent from the application 201, and sends extracted document attribute information 206 to the server 100, thus sending a user authentication request to the server 100.

The server 100 executes a user authentication process 207 for checking if the requested document print process is permitted, by comparing the document attribute information 206 sent from the printer driver 202 on one of the clients 102 to 104 or print server 101 with user identification information registered in a user registration information database 208. The server 100 returns the authentication result of the user authentication process 207 to the printer driver 202 on one of the clients 102 to 104 or print server 101.

If it is determined based on the user authentication result sent from the server 100 that the user is authentic, i.e., the requested print process is permitted, the printer driver 202 on one of the clients 102 to 104 or print server 101 converts text, figure, and image rendering data to generate a printer print control command on the basis of a document print instruction which is sent from the application 201 and contains various print attribute setups, and sends the command to a printer 204 via a spooler 203 of the operating system, thus outputting a document (205).

When a print accounting process as an example of department management in this embodiment is to be executed at the same time, the printer driver 202 on the host system which serves as one of the clients 102 to 104 or print server 101 appends expendable use states such as a paper size, the number of sheets including the number of copies, paper type, the presence/absence of use of staples, color/monochrome print mode, and the like used in the print process to the document attribute information 206 on the basis of various print attribute setups for the document print process, and sends that information to the server 100.

A department management control process in a print process by the server 100 will be described below.

A logging process 209 for executing calculation and accounting processes of printer use states for respective departments such as personal users, groups, affiliations, and the like from a logging information database 210 that stores various kinds of information about printer use states corresponding to resource information such as operating states, functions, expendables used, and the like of the printers 105 to 108, is executed on the basis of the document attribute information 206 sent from the printer driver 202, and the processing result is stored in a department management information database 211 to update its contents.

In the print accounting process of this embodiment, information stored in the logging information database 210 includes unit cost information associated with expendable use states such as a paper size, the number of sheets including the number of copies, paper type, the presence/ absence of use of staples, color/monochrome print mode, and the like used in a document print process.

The logging process 209 executes an accounting calculation process for respective departments such as personal users, groups, affiliations, and the like, who make a document print process, and undergo a print accounting process, and stores the processing result in the department management information database 211 as an accounting result to update the contents of the database 211.

Example of User Registration Information Database

Figure 8:
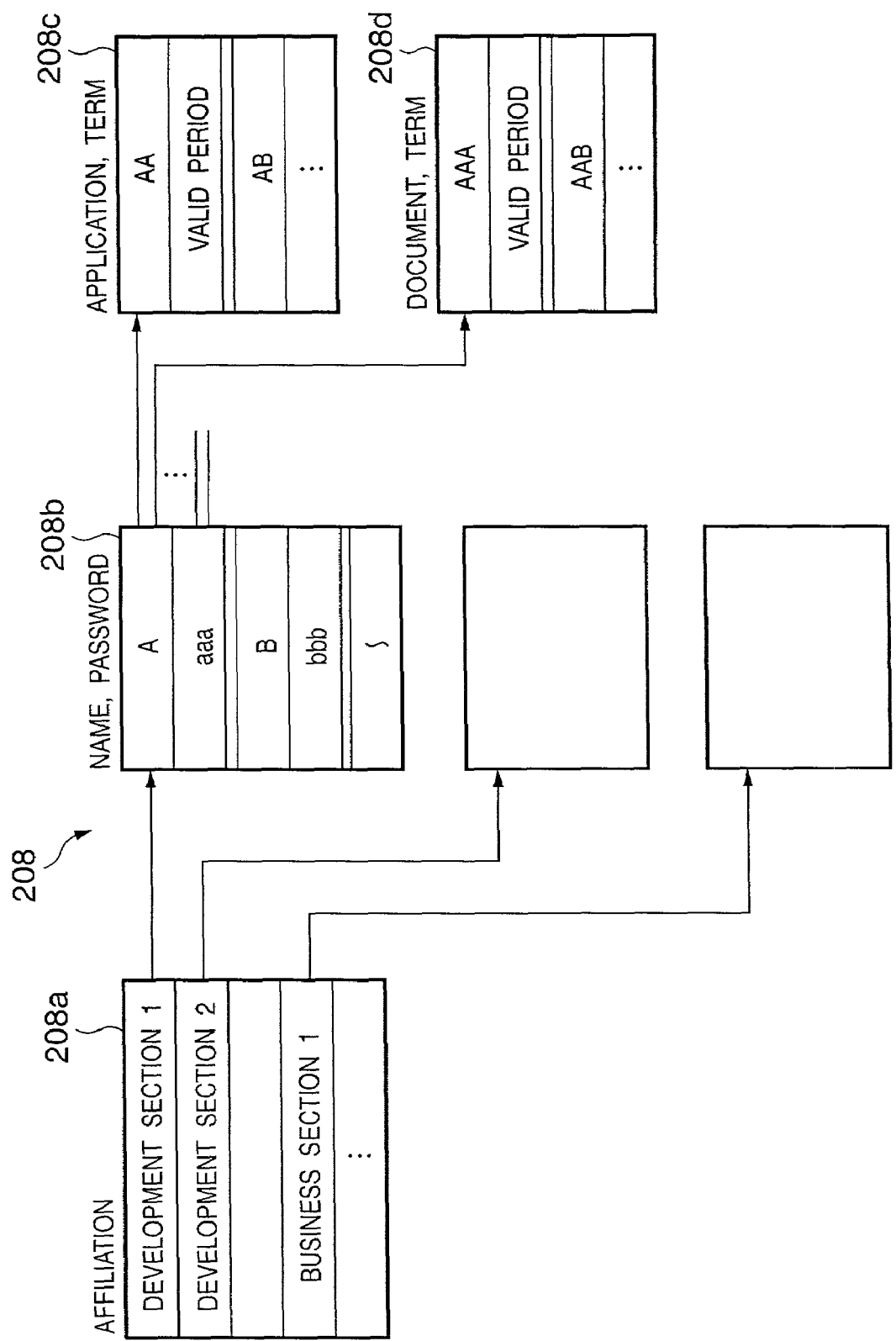
FIG. 8 shows an example of a user registration information database of the first embodiment.

FIG. 8 shows a simple configuration example of the user registration information database 208. FIG. 8 exemplifies a case wherein applications that execute a print process, and documents to be printed are registered together with their print terms.

Respective departments 208a of a company point to tables 208b each of which stores pairs of the names (IDs) and passwords of persons who belong to the corresponding department. From each person, an application 208c that executes a print process, and a document 208d to be printed are registered together with its print term.

When such database is registered, an application name that issued an instruction of a print process, a document name to be printed out, and a valid term of that print process are confirmed, and a name, department, and the like of a person who can execute that print process are also confirmed, thus allowing user and department authentication processes of the print process.

Note that FIG. 8 shows the application name, document name, term, name, and department for the sake of simplicity. To attain securer, effective authentication, various kinds of document attribute information such as a document name, application name, document creator or updater, affiliation of the document creator or updater, password, create/update date, and the like, as described above, or a combination of some pieces of attribute information selected from them according to the feature of an organization may be used.

Operation Example of Printer Driver

The control processes and operations of a printer control program (printer driver) on the RAM 306 in the host system 300 shown in FIG. 2 will be described in detail below.

The printer driver which resides on the RAM 306 and implements a document print process is launched in response to a document output instruction from a document create/edit/printout application program which also resides on the RAM 306.

The printer driver receives various kinds of document attribute information such as a document name, application name, document creator or updater, affiliation of the document creator or updater, password, create/update date, and the like from the application 201, which also resides on the RAM 306, via the application interface (API).

The printer driver extracts information required to authenticate the user who executes a document print process on the basis of the document attribute information sent from the application, and sends the extracted document attribute information to the server, thus sending a user authentication request.

The server executes a user authentication process, and outputs a user authentication result. If it is determined based on the user authentication result that the user is authentic, i.e., that print process is permitted, the printer driver starts a document print control process to be described below.

The document print control process in the printer driver will be described below.

The printer driver sends a control command for initializing the printer to execute print control of the printer in a printer initialization process on the basis of print attribute setup information of a document output instruction from the application.

The printer driver executes a series of processes such as an input data & information interpretation process for interpreting data, various kinds of setup information, and the like used to execute an input process of pattern data, size, rendering output start position, and the like of figure/text and image data to be printed by the printer from the application program on the RAM 306, a rendering output form control process for determining a rendering output form of a document to be printed on the basis of setup parameters that instruct the size, rendering output form, and the like, an output control command conversion process for converting and generating a printer control command of the printer 312 to print the determined document, and an output control command transmission control process for sending the generated printout control command to the printer, thus outputting a document from the printer 312.

Furthermore, when a print accounting process as an example of department management of this embodiment is to be executed, accounting object information is generated, and is sent to the server that makes accounting management.

A document output operation by a printout control process in a control program on the program memory (ROM) 315 in the printer 312 will be explained in detail below.

Printer configuration information of available functions and resources in a print process such as the paper size and type which are currently supported, the presence/absence of an option finisher having a staple function, and the like is sent to the printer driver on the RAM 306 of the host system 300 via the Ethernet interface 317.

The control program receives a control command which is sent from the printer driver on the program memory (RAM) 306 in the host system 300 and instructs to initialize the printer, and executes an initialization process.

Subsequently, the control program executes a series of processes including a print control command input process for inputting a printer print control command sent from the host system so as to control the printer 312 to print, a control setup parameter interpretation process for interpreting the input printer print control command, various setup parameters, and the like, and a bitmap rendering process for generating bitmap data on the basis of the print control command and control setup parameters, and rasterizing the data on a bitmap memory, and sends the generated bitmap data to the printer driving system (engine) 321 via the video interface 319 that exchanges information with the engine control processor, thus outputting a document (322).

Example of Control Processes in Print Server or Client

Respective control processes of the printer control program (printer driver) on the RAM 306 of the host system 300 in this embodiment with the above system arrangement will be described in detail below using the flow charts shown in FIGS. 4 and 5.

Figure 4:
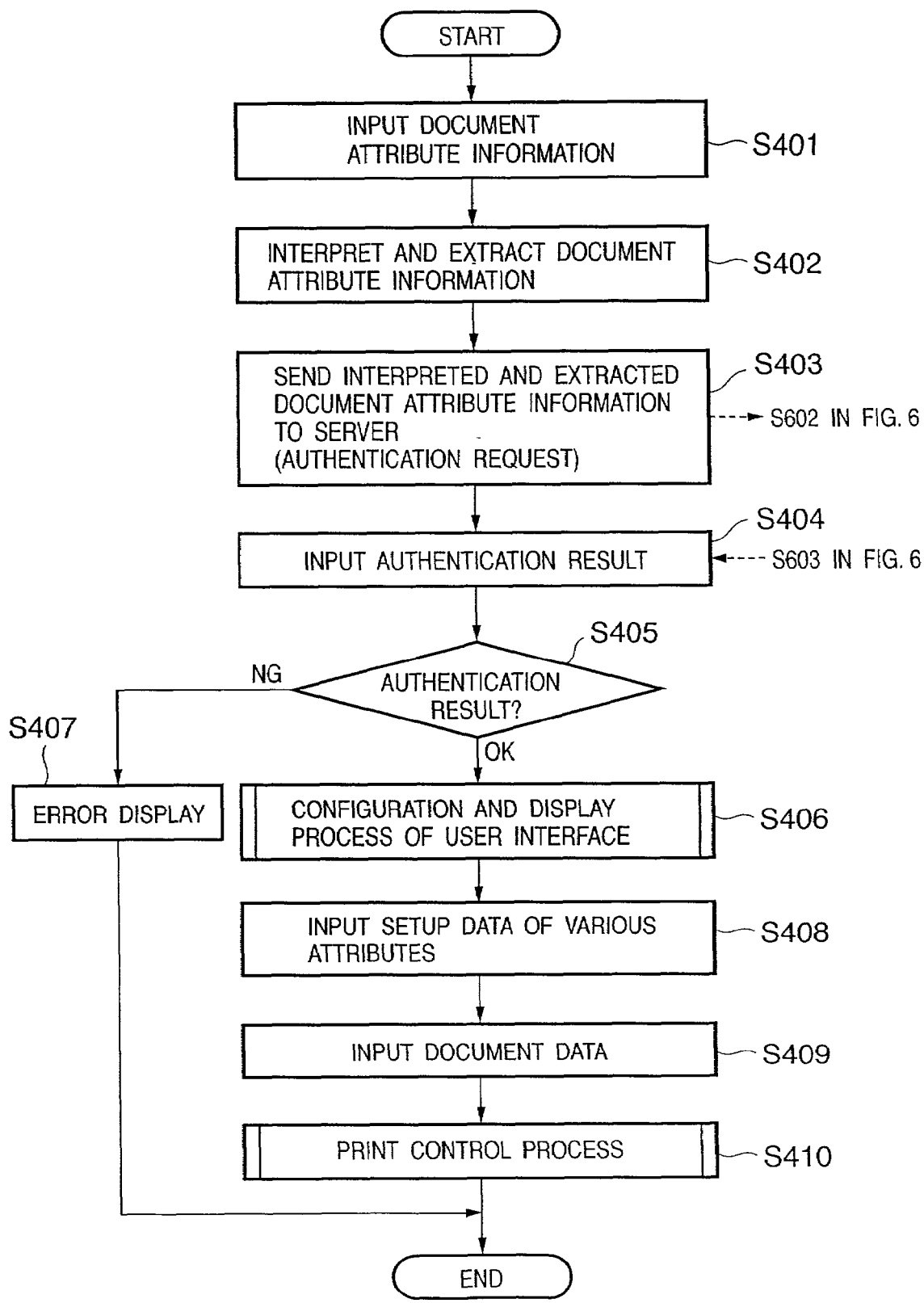
FIG. 4 is a flow chart showing a document attribute information acquisition process, user authentication request process, and print control process in a printer driver according to the first embodiment.

FIG. 4 is a flow chart showing control processes executed until the printer driver on the host system 300 which serves as the print server 101 or one of the clients 102 to 104 according to this embodiment outputs a requested document to the printer 312 via a document attribute information acquisition process from the application, a user authentication request process, a user interface configuration/display process, various print attribute setups, a document data input process, and a print control process.

Step S401 is an input process of various kinds of document attribute information such as a document name, application name, document creator or updater, affiliation of the document creator or updater, password, create/update date, and the like, which are associated with a document in a document print process, from the application on the client. Parameters or data are input/output by calling an API function by the application or printer driver side.

Step S402 interprets the various kinds of input document attribute information to extract information required to issue a user authentication request to the server 100. The extracted document attribute information is sent to the server that executes a print accounting process in department management in step S403, thus sending a user authentication request.

Step S404 is an input process of the authentication result of the user authentication process from the server. Note that the user authentication request and authentication result are exchanged using, e.g., an application interface (API) which exchanges data and information between the user authentication control program on the server 100 and the printer driver on the print server 101 or one of the clients 102 to 104. More specifically, the user authentication request is sent to step S602 in FIG. 6 in step S403, and the authentication result is received from step S603 in FIG. 6 in step S404.

If it is determined in step S405 based on the authentication result that the document print process is permitted, the control starts the subsequent print execution process. On the other hand, if it is determined based on the authentication result that the document print process is denied, an error message is displayed in step S407, thus canceling the print process. In this case, the user interface of the driver may prompt the user to re-input a user ID and password to issue a user authentication request again.

Step S406 is a configuration/display control processor (module) of the user interface that allows the user to make various attribute setups in a print process. The target printer sends device configuration information such as available functions of a device, option devices attached, and the like, e.g., information which pertains to expendables including available paper sizes, paper types, staples of a staple finishing mode, toner/ink, and the like, and that which pertains to a print function including the total memory size, option devices attached such as a finishing device, and the like using two-way communication means with the host system. The available functions and option information based on such device configuration information are reflected in various attribute setup items on the user interface.

Step S408 is an input process of various attribute setup data associated with a print process by making setups on the user interface. Step S409 is an input process of document data such as text/figure/bitmap image and the like that form a document to be printed from the application. The various print attribute setup data (S408) and document data (S409) are passed to a print control processor (module) in step S410, thus executing a print control process.

When a print accounting process as an example of department management in this embodiment is to be executed, accounting object information including use states of expendables including a paper size, paper type, the number of copies, consumed toner/ink amount, staples, and the like used in the print process on the basis of various print attribute setups analyzed by the print processor in step S409, and is sent to the server 100.

Figure 5:
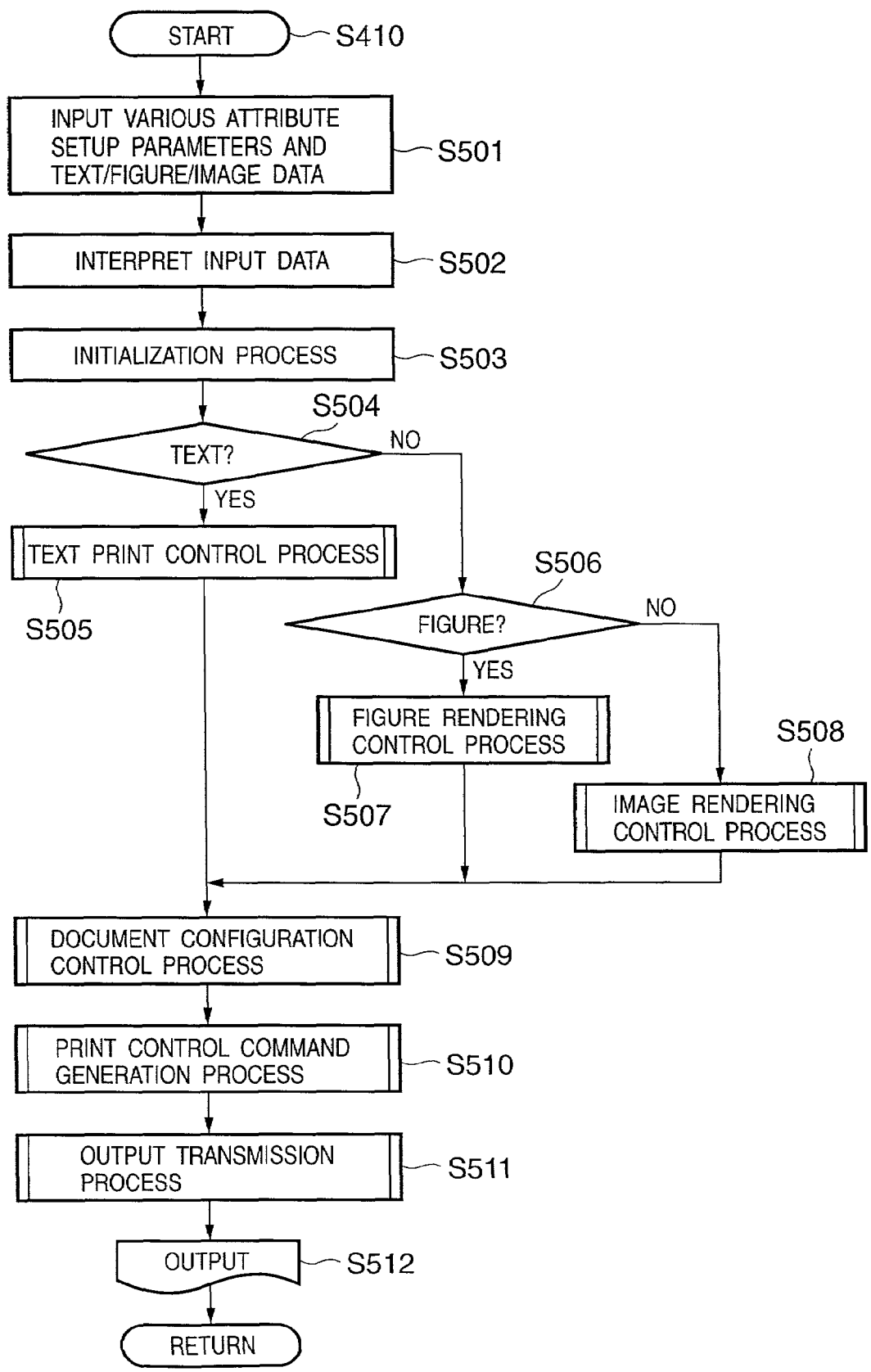
FIG. 5 is a flow chart showing the print control process in the printer driver in the embodiment of the present invention.

FIG. 5 is a flow chart showing details of the print control process by the printer driver on the program memory (RAM) 306 in the host system 300 to which the printer is connected in the print control processor (module) in step S410 in FIG. 4. The printer driver is launched in response to a print instruction from an external program, e.g., a document input program such as a text/figure/image create/edit/print application or the like to a printer, and executes steps S501 to S512.

Step S501 is an input process of various print attribute setup parameters and text/figure/image data that form a document corresponding to the print instruction from the application. Step S502 interprets these input parameters and data. Step S503 converts the setup parameters for the printer to generate a printer control command and sends the command to the printer to initialize it, so as to prepare for a print process including setups of the paper size, print direction, and rendering resolution, a unit setup of the coordinate system, and the like on the basis of the input data interpretation result.

Steps S504 and S506 are processes for separating the interpreted parameters and data into text data, figure data, and image data. The text data, figure data, and image data separated in steps S504 and S506 are respectively processed by a text print control processor (module), figure rendering control processor (module), and image rendering control processor (module) in steps S505, S607, and S508.

Based on the text print, figure rendering, and image rendering control process results in steps S505, S507, and S508, a document configuration control process (module) in step S509 determines pattern output forms such as rendering output attributes, size calculations, rendering output positions, and the like, and lays them out on the output page of the printer. The document output control data formed in step S509 is converted to generate a print control command of the printer by a print control command generation process (module) in step S510 so as to output the document to the printer. An output transmission process (module) to the printer in step S511 sends the print control command generated in step S510 to the printer 312, thus controlling the printer to print out the document (S512).

Example of Department Management Control Process in Server

Respective control processes associated with department management in the server 100 of this embodiment with the above arrangement will be described in detail below using the flow charts shown in FIGS. 6 and 7.

Figure 6:
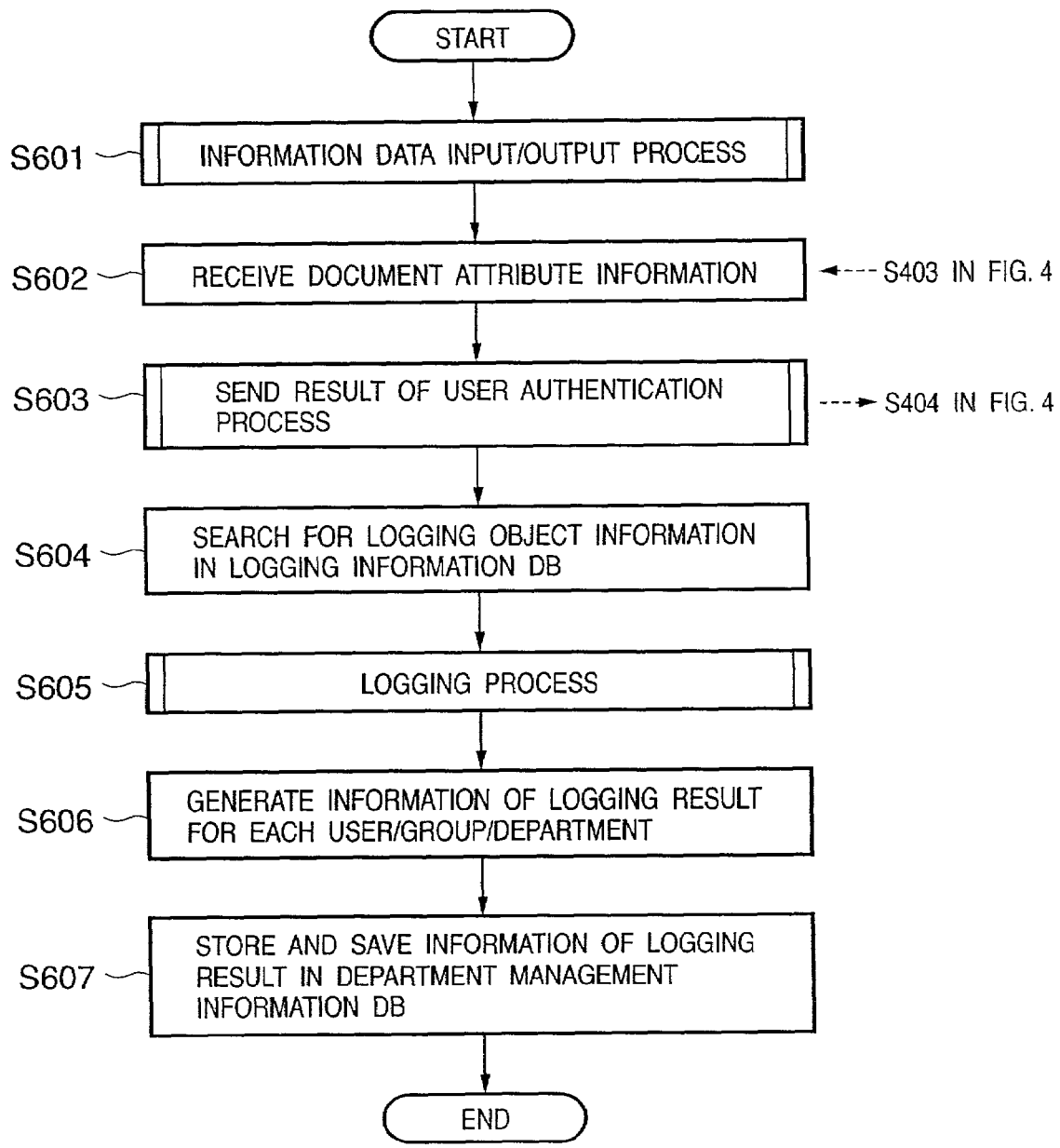
FIG. 6 is a flow chart showing a department management control process on a program memory of a server according to the first embodiment.

FIG. 6 is a flow chart showing the control process on the department management server 100 in this embodiment.

Step S601 is an information data input/output control processor (module) that exchanges data and information using an application interface (API) which inputs/outputs data and information between the print server 101 and clients 102 to 104 on the basis of the communication protocol.

Step S602 is a reception process of user identification information which is used to make user authentication and pertains to a document to be printed, and a user authentication request from the printer driver on the print server 101 or one of the clients 102 to 104 on the basis of the process in the information data input/output control processor. Step S603 is a user authentication process control processor (module) for executing an authentication process on the basis of the input user identification information and user authentication request. The authentication result in this process is similarly sent to the print server 101 or one of the clients 102 to 104 by the information data input/output control processor.

Step S604 searches the logging information database 210 for logging information associated with each object which is to undergo department management on the basis of logging object information which is sent and input from the printer driver on the print server or client on the basis of the process of the information data input/output control processor. Step S605 is a control processor (module) for executing a logging process on the basis of the department management information and logging information associated with each object which is to undergo department management. Based on the logging result processed by the control processor (module) for executing the logging process, information of the logging result for each department such as a personal user, group, affiliation, or the like is generated in step S606. The logging result information generated for each department such as a personal user, group, affiliation, or the like is stored/saved in the department management information database 211 in step S607.

When a print accounting process as an example of department management in this embodiment is to be executed, step S604 searches the logging information database 210 for logging information associated with each object which is to undergo department management as a cost information database for cost associated with each accounting object using logging object information, which is sent and input from the printer driver on the print server or client based on the process of the information data input/output control processor and is used as accounting object information.

Step S604 searches the logging information database 210 for logging information associated with each object which is to undergo department management using logging object information which is sent and input from the printer driver on the print server or client based on the process of the information data input/output control processor. Step S605 is a control processor (module) for executing an accounting calculation process based on the accounting object information and cost information associated with each accounting object as a logging process controller (module). Based on the accounting result calculated by the control processor (module) that executes the accounting calculation process, accounting result information is generated for each user, group, or department in step S606. The accounting result information generated for each user, group, or department is stored/saved in the accounting information database 211 in step S607.

Figure 7:
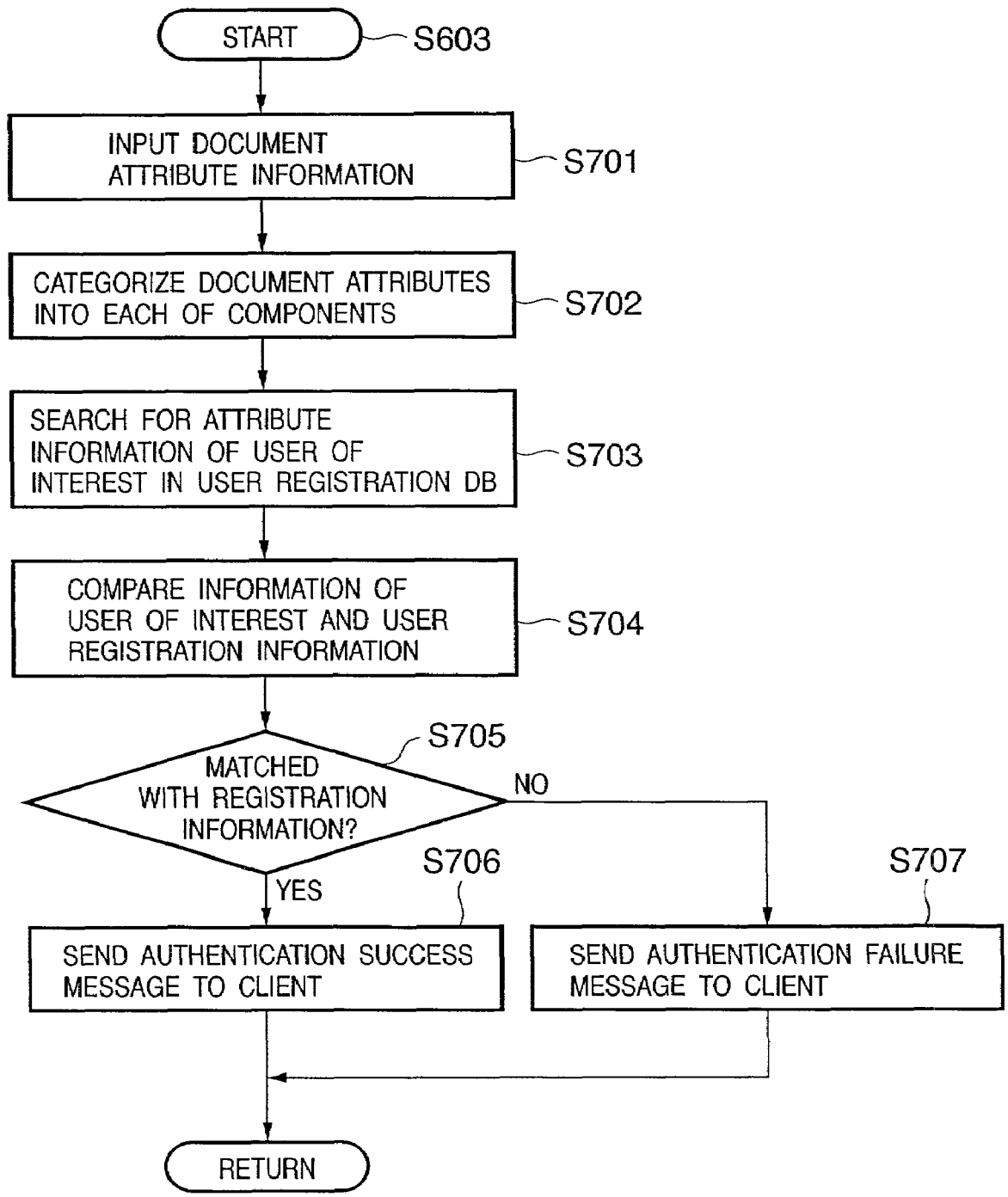
FIG. 7 is a flow chart showing a user authentication control process on the program memory of the server according to the first embodiment.

FIG. 7 is a flow chart showing details of the user authentication process in the user authentication control processor (module) in step S603 in FIG. 6.

Step S701 is an input process of various kinds of document attribute information, which are used in user identification required for user authentication of a document to be printed, from the print server 101 or one of the clients 102 to 104. Step S702 categorizes the document attribute information into respective components as identification information of the document name, document creator or updater, or the like used in user identification. Step S703 searches the user registration database 208 shown in, e.g., FIG. 8 for the categorized user identification information. Furthermore, step S704 compares the user identification information of the corresponding user who executes a document print process with the user registration information on the basis of the search result of the user registration database.

If it is determined in step S705 that the user identification information matches the user registration information, an authentication result indicating that authentication has succeeded is sent to the printer driver on the print server or client that issued the user authentication request in step S706. On the other hand, if it is determined in step S705 that the user identification information does not match the user registration information, an authentication result indicating that authentication has failed is sent.

Therefore, according to this embodiment, the application on the host system which issues a document print instruction and serves as a client passes various kinds of document attribute information, which are required for user authentication associated with a document to be printed, to the printer driver via the API, and the server that makes department management executes user authentication, thus providing an automatic authentication system in department management of a printer that can achieve the object of the present invention.

Modification of First Embodiment

In this embodiment, a sending process of various kinds of document attribute information required for user authentication associated with a document to be printed, and a user authentication request, which are processed by the printer driver on the program memory (RAM) 306 of the host system 300, which serves as the print server 101 or one of the clients 102 to 104, in the first embodiment, may be implemented by a control process program on the program memory (ROM) 315 or (RAM) 316 in the printer 312. At this time, various kinds of document attribute information are sent to the printer after being converted into a print control command of the printer. Also, this process can be implemented by sending information from a printer having the function of the present invention, e.g., the high-speed, large-capacity printer 105 in FIG. 1 to the server 100 that makes department management using printer MIB or the like on the basis of a prescribed communication protocol.

Another Modification of First Embodiment

In this embodiment, in place of direct user's individual information such as a document creator/updater, affiliation, and the like arbitrarily or automatically input upon creating/updating a document in a document print process by the application, an application name, document name, or specific keyword may be used in authentication process, thus implementing a user authentication system of this embodiment. In this embodiment, print accounting management can be further diversified.

Still Another Modification of First Embodiment

Figure 2:
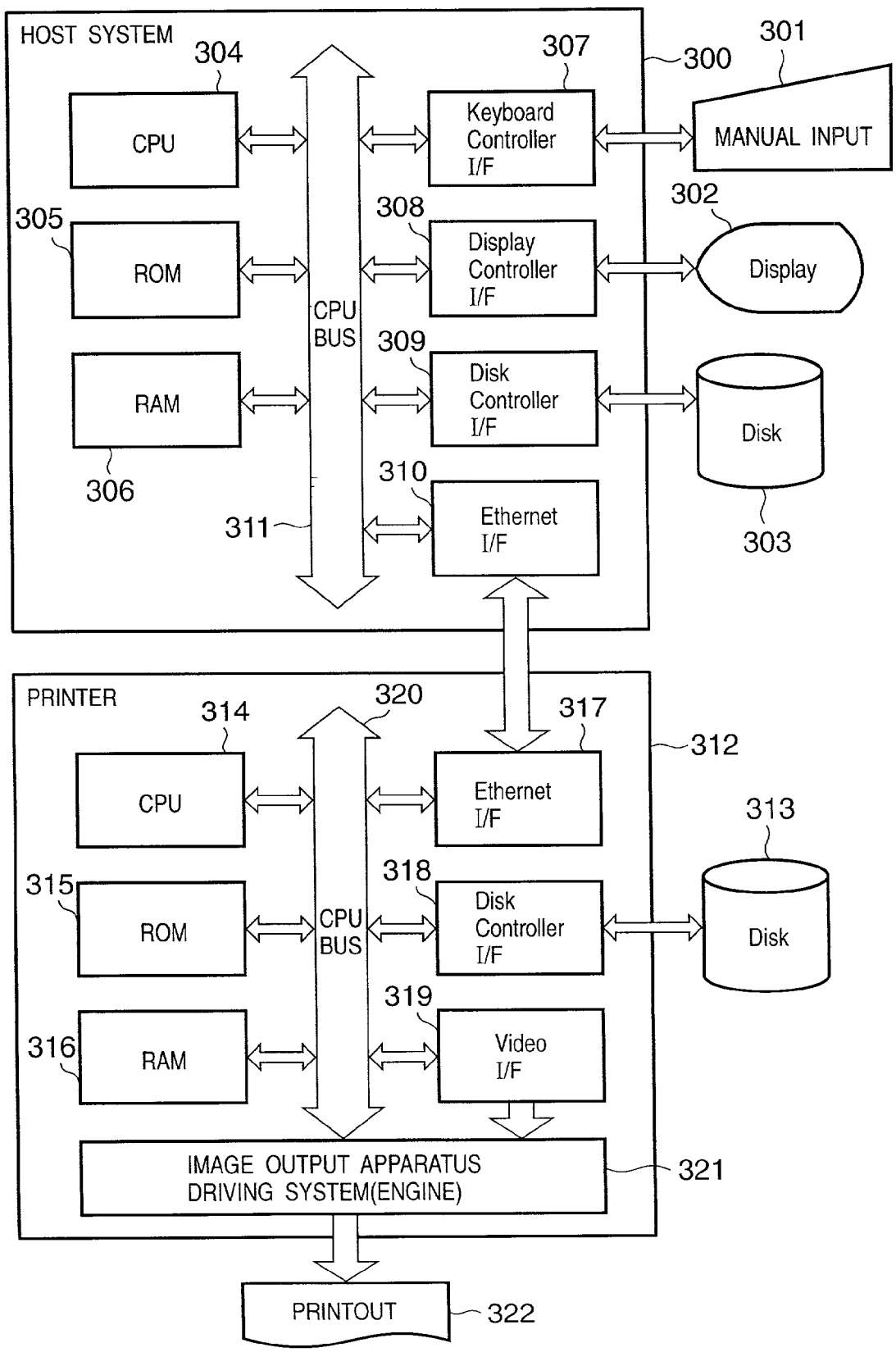
FIG. 2 is a block diagram showing the arrangement of a host system comprising a print server and client, and a printer connected to the host system, which are used in an embodiment of the present invention.

This embodiment uses a Centronics input/output parallel interface, RS-232C or RS-424 input/output serial interface, or SCSI interface in place of the Ethernet interface that connects the host system and printer shown in FIG. 2 so as to exchange data between the printer driver on the program memory (RAM) 306 in the host system and the printer 312 shown in FIG. 3.

As described above, according to the first embodiment, when use of printers associated with document print processes is managed for respective departments, the user who executes a print process can be automatically authenticated without any manual operations on the basis of various kinds of document attribute information such as a document name, application name, document creator or updater, affiliation of the document creator or updater, password, create/update date, and the like from an application that issues a document print instruction, thus implementing and providing an automatic user authentication system in department management, which can maintain high security and can improve operability upon authentication.

Second Embodiment

Outline of Operation Example in this Embodiment

In this embodiment, in a system constituted by a host system serving as a print server or client, and a printer, which are connected based on a network communication protocol, the client issues a document print instruction to a target printer.

Upon executing a document print process from an application on the host system, a printer control program (printer driver) on the host computer receives various kinds of document attribute information such as a document name, application name, document creator or updater, affiliation of the document creator or updater, password, create/update date, and the like, which are associated with a document, via an application interface, and sends user identification information used in user authentication to the printer on the basis of such attribute information.

The user inputs his or her user ID or password on the control panel of the printer, and a user authentication process for comparing the input user ID or password with the user identification information is done. If authentication has succeeded, the printer prints a target document.

Example of Arrangement of Automatic Authentication System in Print Process of this Embodiment Since the system of this embodiment and an example of the connection arrangement between the host system and printer have already been explained with reference to FIGS. 1 and 2 of the first embodiment, a detailed description thereof will be omitted.

Figure 9:
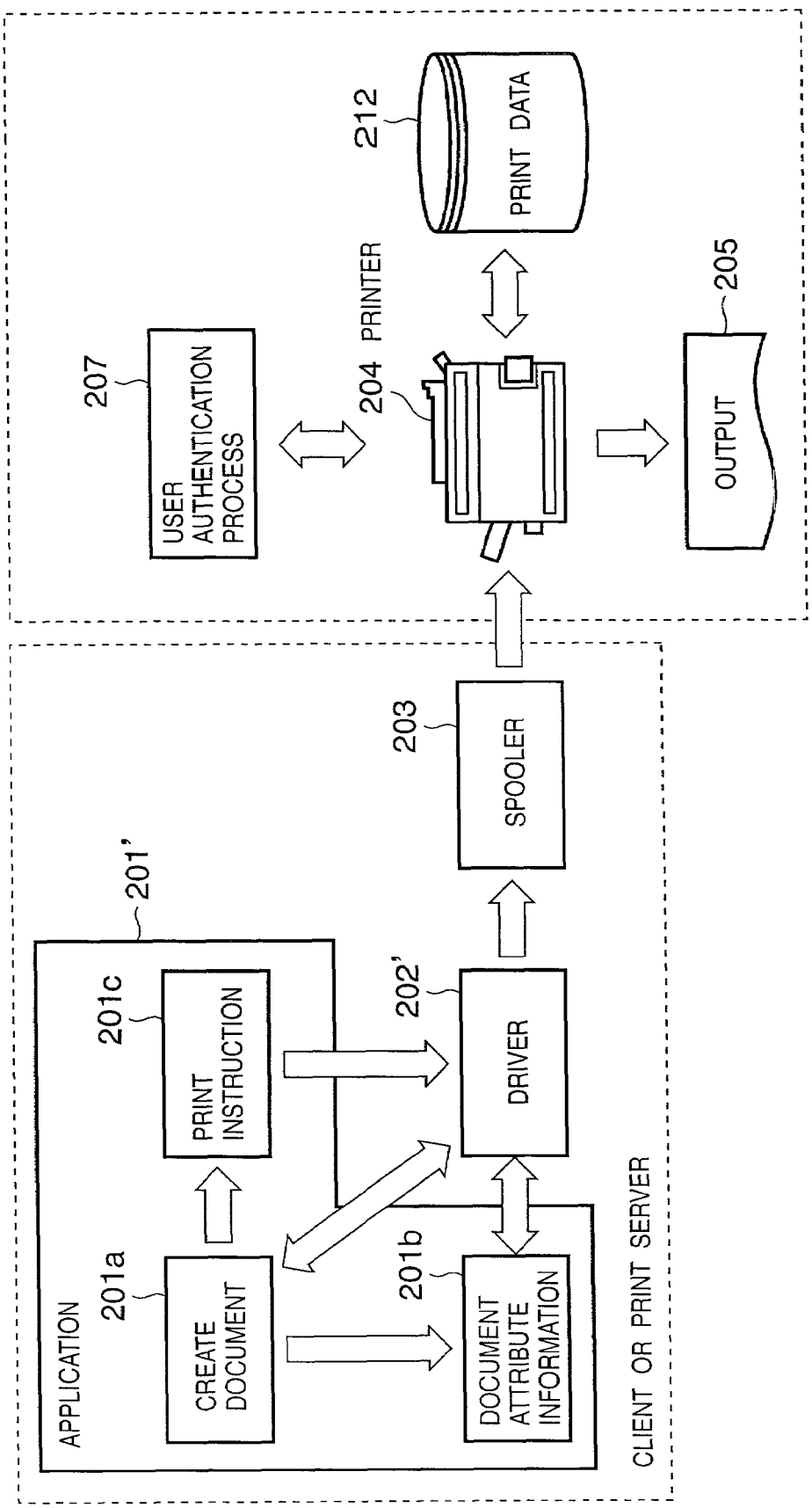
FIG. 9 is a block diagram showing the flow of data according to the second embodiment.

Example of Operation of Automatic Authentication System in Print Process of this Embodiment Operation Example of System FIG. 9 is an example of the arrangement that shows control processes and the flow of control in respective control programs on the host system and printer shown in FIG. 2.

The user creates a document (201a) using an application program 201' which resides on a RAM 106 of a host system 100. In this case, the user arbitrarily inputs various kinds of document attribute information 201b such as a document name, application name, document creator or updater, affiliation of the document creator or updater, password, create/update date, and the like, or the application program and operating system automatically generate and input the information 202.

The user also makes various attribute setups for a print process with respect to a printer driver 202' which also resides on the RAM 106 of the host system 100, and issues a document print instruction 201c. At the same time, the application sends various kinds of document attribute information 201b mentioned above input upon creating the document to the printer driver 202' via an application interface (API). In this case, various kinds of document attribute information 201b are sent in the form of parameters or data mapped on a program memory using the API.

The printer driver 202' on the RAM 106 of the host system 100 converts text, figure, and image rendering data to generate a print control command of a printer 204 on the basis of the document print instruction 201c which is sent from the application and contains various print attribute setups. At the same time, the printer driver 202' extracts information required to authenticate the user who executes a document print process on the basis of the document attribute information 201b sent from the application, and converts the extracted information to generate a print control command of the printer 204. The printer driver 202' then sends the generated print control command to the printer 204 together with that generated for the document print process via a spooler 203 of the operating system.

Upon receiving the print control commands, the printer 204 stores/saves these commands in a RAM 116 in the printer or a storage device such as a hard disk 113 or the like as document print job data (212). The printer 204 displays a list of stored/saved print jobs on the user interface of the control panel, and prompts the user to select a job to be printed. At this time, the user inputs his or her user ID or password on the printer control panel to issue a user authentication request. Furthermore, a control program on the printer 204 executes a user authentication process (207) by comparing the information for user authentication, which is contained in the print job data, and the input user ID or password. If it is determined based on this authentication result that authentication has succeeded, i.e., the job is printable, a document is printed out (205).

Example of User Authentication Information

Figure 13:
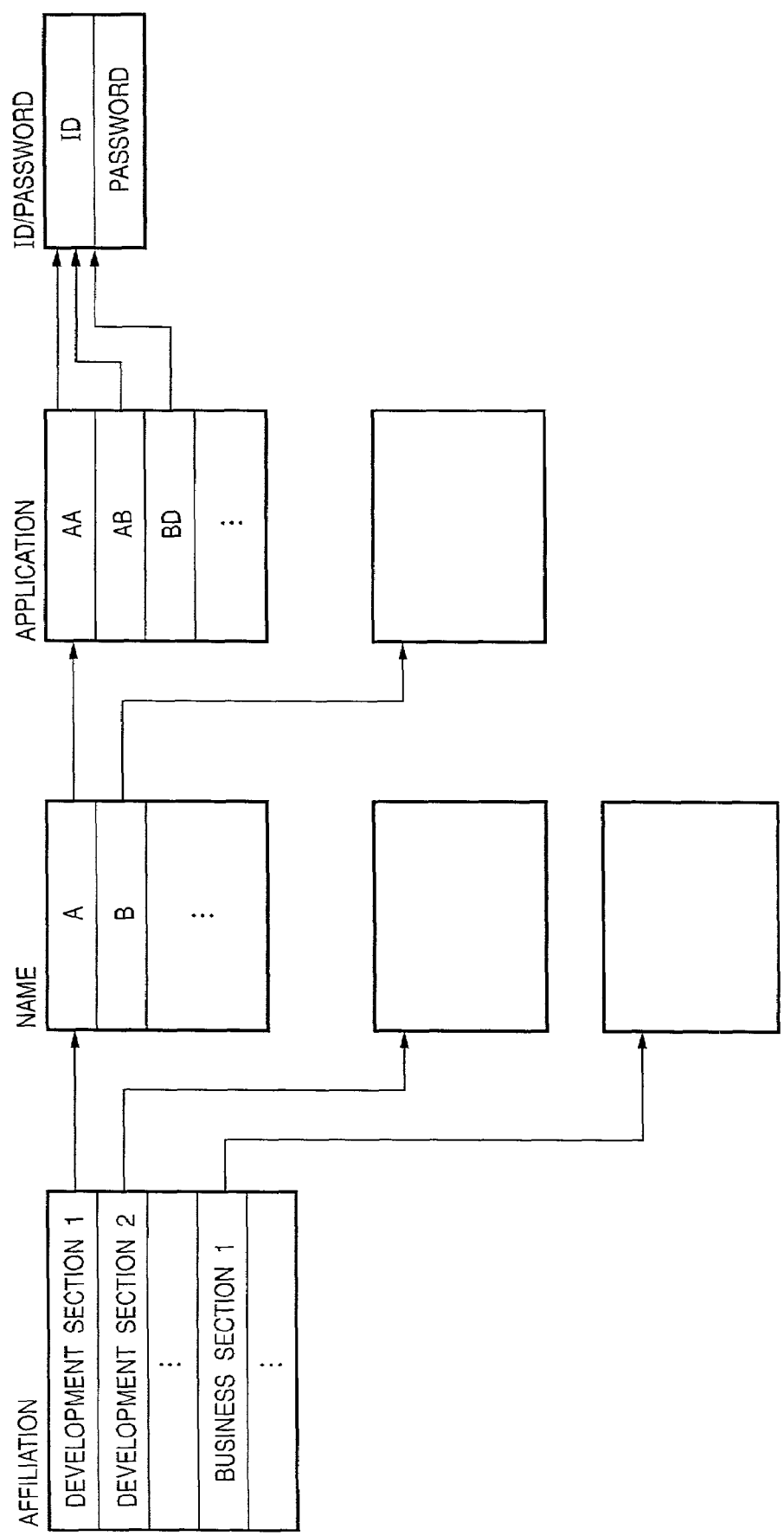
FIG. 13 shows an example of user authentication information of the second embodiment.

FIG. 13 shows a simple example of user authentication information used to generate an ID and password from document attribute information.

Respective departments of a company point to tables each of which contain the names of persons who belong to the corresponding department. From each person, an application name that executes a print process is registered. An ID and password are registered in correspondence with each combination of the department, person name, and application name. In FIG. 13, data created by applications AA, AB, and BD executed by A in development section 1 are sent to the printer while an identical ID and password are appended to them.

With such registration, user authentication of a print process can be done based on the department, name, application name, which issued a print process instruction.

Note that FIG. 13 shows the application name, name, and department for the sake of simplicity. To attain securer, effective authentication, various kinds of document attribute information such as a document name, application name, document creator or updater, affiliation of the document creator or updater, create/update date, and the like, as described above, or a combination of some pieces of attribute information selected from them according to the feature of an organization may be used.

Operation Example of Printer Driver

The control processes and operations of a printer control program (printer driver) on the RAM 106 in the host system 100 will be described in detail below.

The printer driver which resides on the RAM 106 in the host system 100 and implements a document print process is launched in response to a document output instruction from a document create/edit/printout application program which also resides on the RAM 106.

The printer driver receives various kinds of document attribute information such as a document name, application name, document creator or updater, affiliation of the document creator or updater, password, create/update date, and the like from the application, which also resides on the RAM 106, via the application interface (API).

The printer driver extracts information required to authenticate the user who executes a document print process on the basis of the document attribute information sent from the application, converts the extracted information into a print control command of a printer 112, and sends the command to the printer 112.

A document print control process of the printer driver will be explained below.

The printer driver sends a control command for initializing the printer to execute print control of the printer in a printer initialization process on the basis of print attribute setup information of a document output instruction from the application.

The printer driver executes a series of processes such as an input data & information interpretation process for interpreting data, various kinds of setup information, and the like used to execute an input process of pattern data, size, rendering output start position, and the like of figure/text and image data to be printed by the printer from the application program on the RAM 106, a rendering output form control process for determining a rendering output form of a document to be printed on the basis of setup parameters that instruct the size, rendering output form, and the like, an output control command conversion process for converting and generating a printer control command of the printer 112 to print the determined document, and a output control command transmission control process for sending the generated printout control command to the printer, thus outputting a document from the printer 112.

A document output operation by a print output control process in the control program on the ROM 115 and RAM 116 in the printer 112 will be described in detail below.

The control program receives a control command for initializing the printer, which is sent from the printer driver on the RAM 106 in the host system 100, and executes an initialization process.

Subsequently, the control program executes a series of processes including a print control command input process for inputting a printer print control command sent from the host system 100 so as to control the printer 112 to print, a control setup parameter interpretation process for interpreting the input printer print control command, various setup parameters, and the like, and a bitmap rendering process for generating bitmap data on the basis of the print control command and control setup parameters, and rasterizing the data on a bitmap memory, and sends the generated bitmap data to a printer driving system (engine) 121 via a video interface 119 that exchanges information with an engine control processor, thus outputting a document (322).

Example of Control Processes in Application

Figure 10:
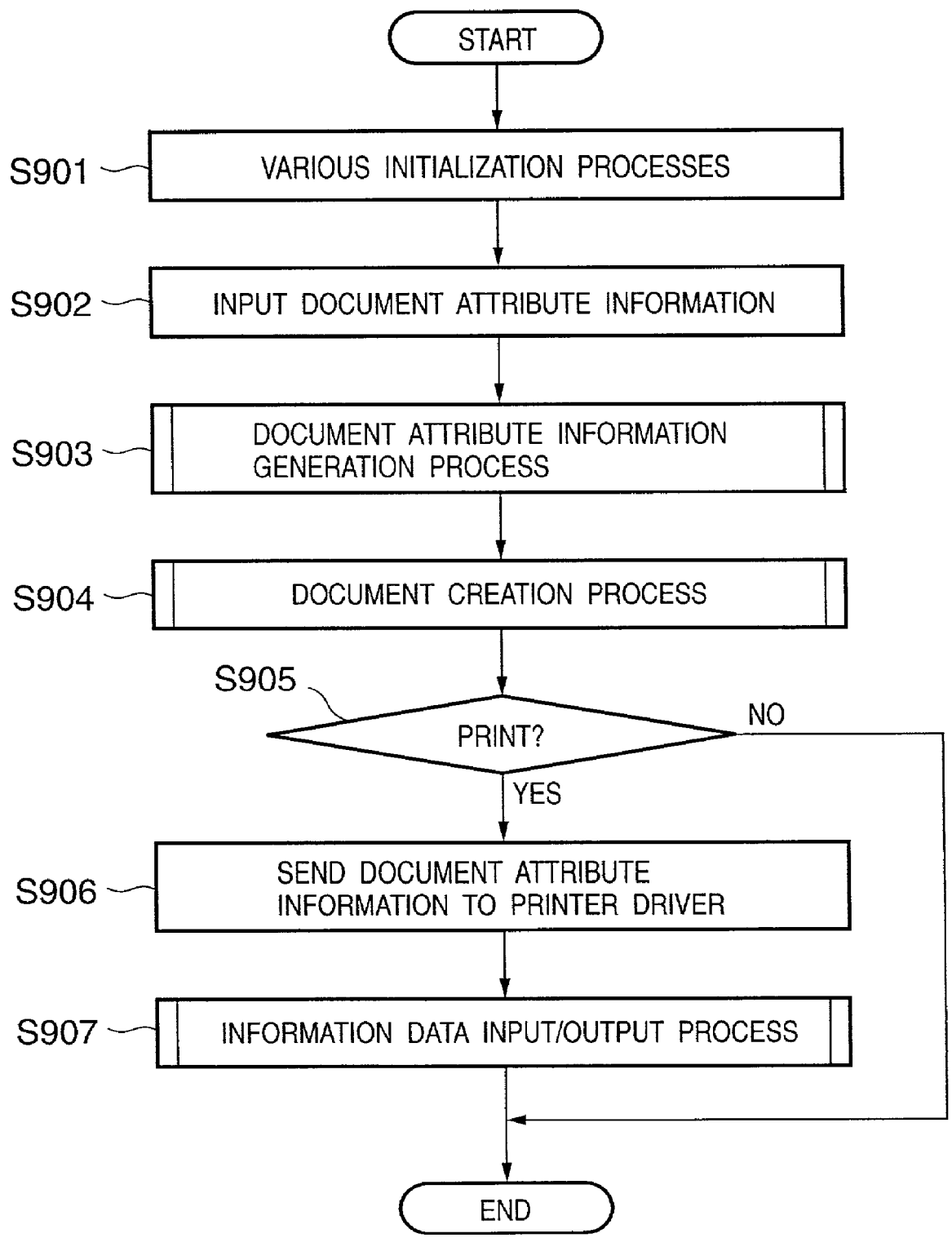
FIG. 10 is a flow chart showing respective control processes in an application of the second embodiment.

FIG. 10 is a flow chart showing respective control processes in the application program on the RAM 106 of the host system 100.

Step S901 executes various initialization processes including an initialization process executing upon launching the application program, and those based on various attribute setups that pertain to document creation. Step S902 is an input process of document attribute information such as a document file name, comment, affiliation of a document creator/updater, password, and the like, and the document creator or updater arbitrarily inputs such information. Step S903 is a document attribute information generation processor (module) for inputting document attribute information such as a document name, application name, document creator or updater, create/update date, and the like, which are associated with a document. Since these pieces of attribute information input in this step can be acquired from the application program and operating system using a prescribed application interface (API), they are automatically input. Step S904 is a document create processor (module) for making creation, edit, update, and the like of a document.

It is checked in step S905 if a document created, edited, or updated by the document create processor (module) S904 is to be printed. If the document is to be printed, various kinds of input/created document attribute information are sent to the printer driver on the RAM 106 of the host system 100 using an application interface (API) provided by the present invention in step S906 in an information data input/output processor (module) in step S907. On the other hand, if the document is not to be printed, this control process ends.

Example of Control Processes in Printer Driver

Respective control processes of the printer control program (printer driver) on the RAM 106 of the host system 100 in this embodiment will be described in detail below using the flow chart shown in FIG. 11.

Figure 11:
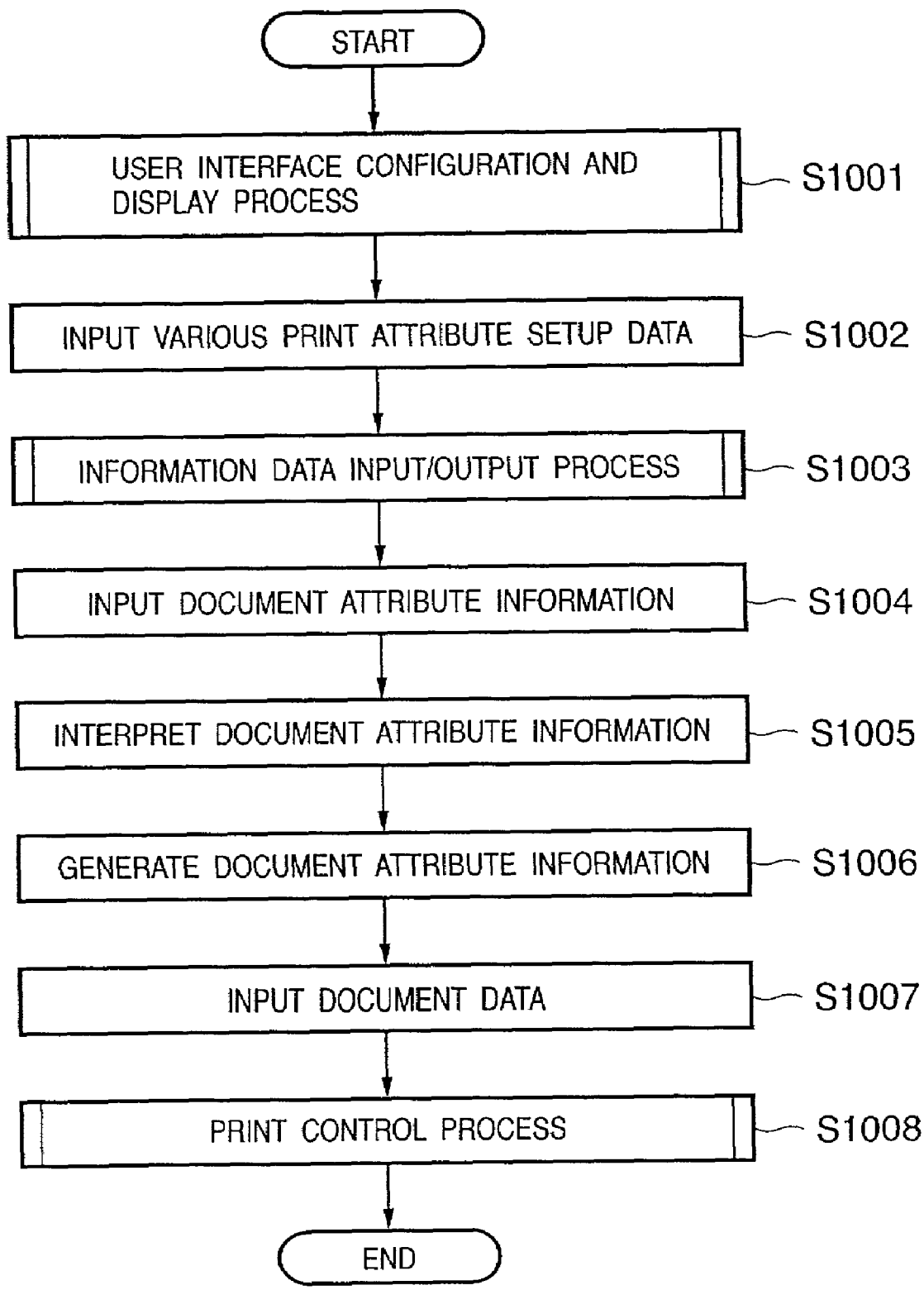
FIG. 11 is a flow chart showing a user interface configuration/display process, various attribute setup processes, document attribute information acquisition process, document data input process, and print control process in a printer driver of the second embodiment.

FIG. 11 is a flow chart showing control processes executed until the printer driver on the host system 100 outputs a requested document to the printer 112 via a user interface configuration/display process, various print attribute setups, a document attribute information acquisition process from the application, a document data input process, and a print control process.

Step S1001 is a configuration/display control processor (module) of the user interface that allows the user to make various attribute setups in a print process. Step S1002 is an input process of various attribute setup data associated with a print process by making setups on the user interface. Step S1003 is an information data input/output control processor (module) for exchanging data and information using an application interface (API) that inputs/outputs data and information between the application and printer driver.

Step S1004 is an input process of various kinds of document attribute information such as a document name, application name, document creator or updater, affiliation of the document creator or updater, password, create/update date, and the like, which are associated with a document in a document print process from the application on the client on the basis of the process in the information data input/output control processor. Parameters or data are input/output by calling the API function by the application or printer driver side. Step S1005 interprets the various kinds of input document attribute information to extract information required to make user for the printer 112. Step S1006 converts the interpreted/extracted attribute information to generate a print control command of the printer 112 or parameters of the print control command.

Step S1007 is an input process of print document data such as text/figure/bitmap image and the like that form a document to be printed from the application. Various print attribute setup data (S1002) and document data (S1007) are passed to a print control processor (module) in step S1008 to execute a print control process.

Note that the flow chart which shows the print control process of the printer driver on the RAM 106 in the host system 100 to which the printer is connected in the print control processor (module) in step S1008 in FIG. 11 is the same as that in FIG. 5 of the first embodiment, and a detailed description thereof will be omitted.

Example of Control Processes in Printer

Figure 12:
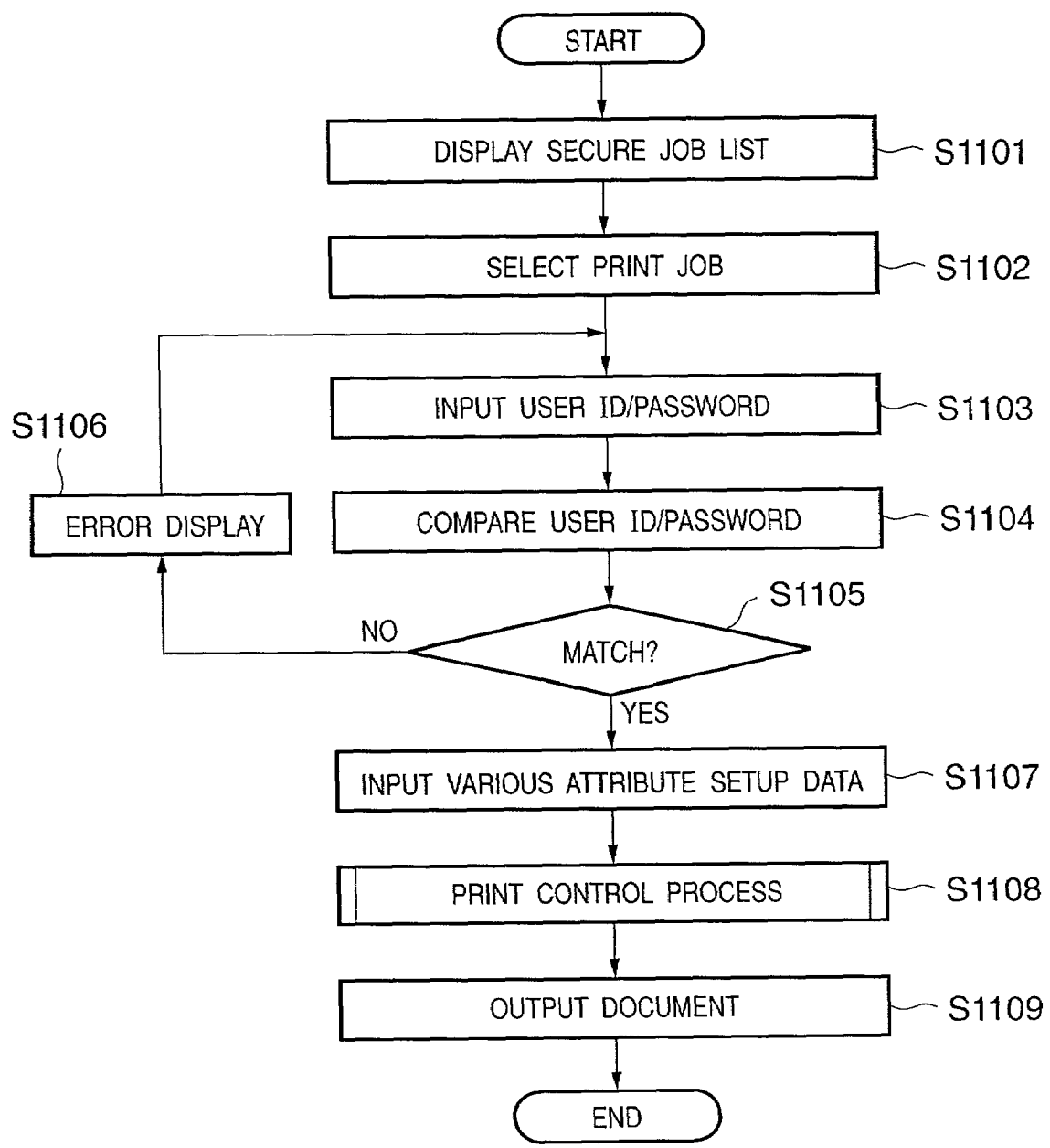
FIG. 12 is a flow chart showing respective control processes on a program memory of a printer of the second embodiment.

Respective control processes of the printer 112 of the second embodiment will be described in detail below using the flow chart shown in FIG. 12.

Step S1101 displays a list of print standby secure print jobs on the user interface of the control panel of the printer 112 on the basis of document print job data stored/saved in the program memory (RAM) 116 or a storage device such as the hard disk 113 or the like in the printer 112. Step S1102 prompts the user to select a job to be printed from those displayed in the list. At this time, the user inputs his or her user ID or password at the user interface on the printer control panel in step S1103 to issue a user authentication request. The input user ID or password is compared with information for user authentication contained in the print job data in step S1104, thus executing a user authentication process. If it is determined in step S1105 based on the authentication result that the input user ID or password matches the information, i.e., if it is determined that authentication has succeeded and the job is printable, the control enters the subsequent print process. On the other hand, if the input user ID or password does not match the information, an error message is displayed in step S1106 to prompt the user to re-input the user ID or password.

If it is determined in step S1105 that the job is printable, various print attribute setup data are input in step S1107. A print control processor (module) in step S1108 executes an image output control process together with print job data, thus outputting a document (S1109).

Therefore, according to the second embodiment, the application on the host system that issues a document print instruction passes various kinds of document attribute information required for authentication associated with a document to be printed via an API, and the printer executes user authentication before it prints a document, thus providing an automatic authentication system in a secure print process of a printer, which can achieve the object of the present invention.

Modification of Second Embodiment

In this embodiment, in place of direct user's individual information such as a document creator/updater, affiliation, and the like arbitrarily or automatically input upon creating/updating a document in a document print process by the application, an application name, document name, or specific keyword may be used in authentication process, thus further setting an output priority order of standby document print jobs.

Another Modification of Second Embodiment

This embodiment uses a Centronics input/output parallel interface, RS-232C or RS-424 input/output serial interface, or SCSI interface in place of the Ethernet interface that connects the host system and printer shown in FIG. 2 so as to exchange data between the printer driver on the program memory (RAM) 106 in the host system 100 and the printer 112 shown in FIG. 1, thus also achieving the object of the present invention.

As described above, according to the second embodiment, when a secure print process is executed using a printer that executes a document print process, the user who executes a print process can be automatically authenticated without any manual operations on the basis of various kinds of document attribute information such as a document name, application name, document creator or updater, affiliation of the document creator or updater, password, create/update date, and the like from an application that issues a document print instruction, thus implementing and providing an automatic user authentication system in department management, which can maintain high security and can improve operability upon authentication.

Third Embodiment

The third embodiment implements an authentication & accounting system upon using an application together with the first or second embodiment.

Example of Arrangement of Automatic Authentication System in Print Process of this Embodiment Since the system of this embodiment and an example of the connection arrangement between the host system and printer have already been explained with reference to FIGS. 1 and 2 of the first embodiment, a detailed description thereof will be omitted.

Example of Operation of Automatic Authentication System in Print Process of this Embodiment

Operation Example of System

Figure 14:
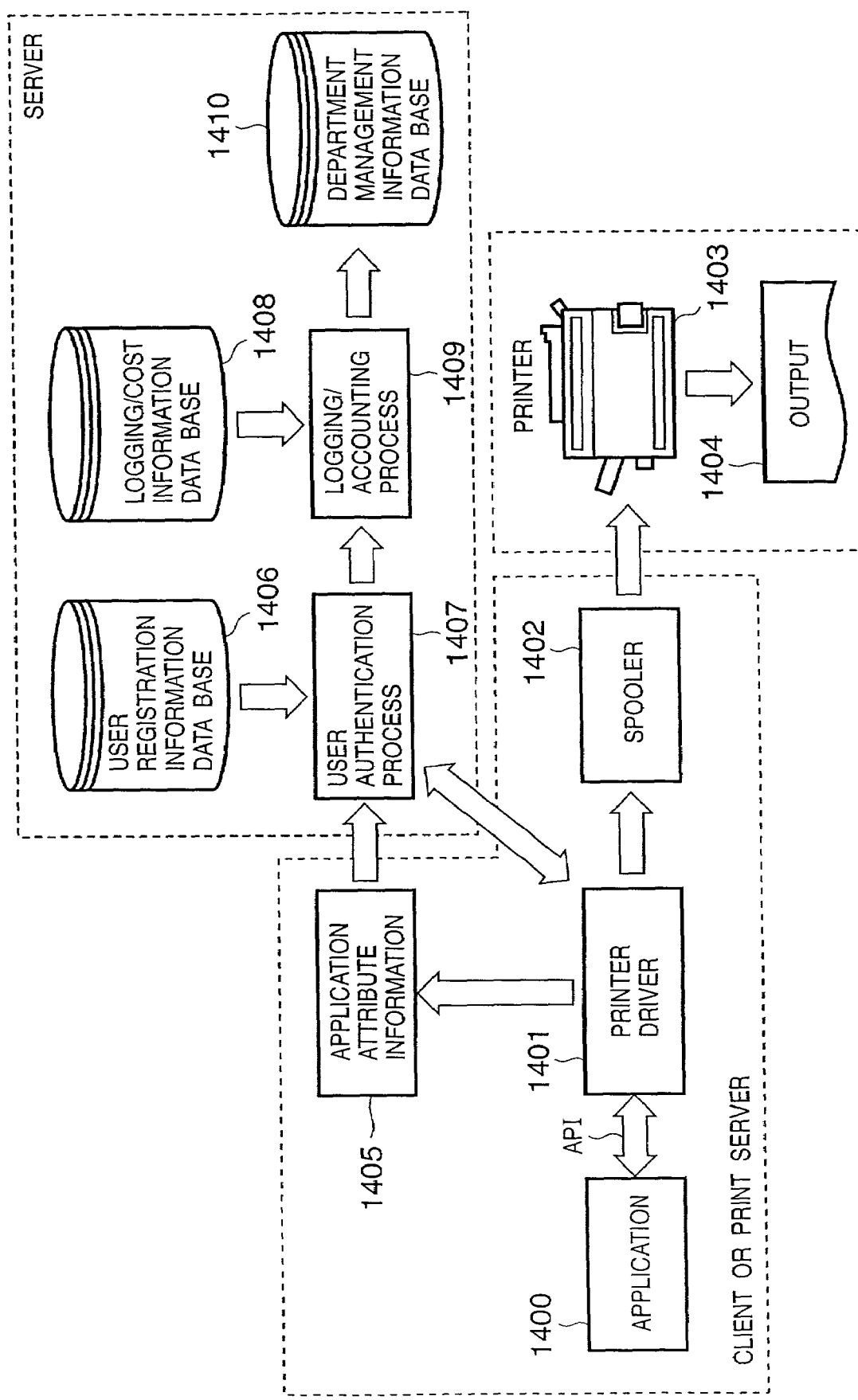
FIG. 14 is a block diagram showing the flow of data to show an example of user authentication and accounting processes by an application according to the third embodiment.

FIG. 14 is an example of the arrangement that shows control processes and the flow of control in respective building components of the network constituted by the server, clients, and printers shown in FIG. 1.

The user creates and saves a document using an application 1400 on one of the clients 102 to 104. In this case, various kinds of application attribute information 1405 such as an application name, application user, affiliation of the application user, password, use date, and the like, which are associated with the application used, are input by the user or automatically on an application program process.

Also, using application 1400, the user makes various attribute setups for a print process to a printer driver 1401 on one of the clients 102 to 104 or print server 101, and issues a document print instruction.

At the same time, the application 1400 sends various kinds of application attribute information, which are input upon using the application, to the printer driver 1401 via an application interface (API). In this case, various kinds of application attribute information are sent in the form of parameters or data mapped on a program memory using the API.

Note that the printer driver 1401 can acquire the application attribute information via an application program interface (API) of the operating system. In case of a dedicated application, when application program interfaces (API) defined by the application 1400 and printer driver 1401 are prepared and used, the printer driver 1401 can acquire the application attribute information.

The printer driver 1401 on one of the clients 102 to 104 or print server 101 extracts information used to authenticate the user who executes a document print process, and the application name on the basis of the application attribute information sent from the application 1400, and sends extracted application attribute information 1405 to the server 100, thus issuing a user authentication request and application use permission request to the server 100.

The server 100 executes a user authentication process 1407 for comparing the application attribute information 1405 sent from the printer driver 1401 on one of the clients 102 to 104 or print server 101 with user identification information registered in a user registration information database 1406, and checking if that user is granted the right of use of the application of interest, i.e., the user is granted permission of use of the application. The authentication result of the user authentication process 1407 is returned to the printer driver 1401 on one of the clients 102 to 104 or print server 101.

If it is determined based on the user authentication result sent from the server 100 that the user can use the application of interest, the printer 1401 on one of the clients 102 to 104 or print server 101 converts text, figure, and image rendering data to generate a printer print control command on the basis of the document print instruction, which is sent from the application 1400 and contains various print attribute setups, and sends the command to the printer 1403 via a spooler 1403 of the operating system, thus outputting a document (1404).

At the same time, when an accounting process for use of the application is executed together with the print accounting process as an example of department management in this embodiment, the printer driver 1401 on the host system which serves as one of the clients 102 to 104 or print server 101 appends the use time upon using the application, the data size generated by the application, and the like to application attribute information 1405 on the basis of various application attribute setups upon using the application together with expendable use states for a print process, and sends the information to the server 100.

Example of Accounting Process

An accounting process as an example of department management in a print process by the server 100 will be explained below.

A logging/accounting process 1409 for executing calculation and accounting processes of application and printer use states for respective departments such as personal users, groups, affiliations, and the like from a logging/cost information database 1408 that stores various kinds of information such as cost corresponding to an application use state, and various kinds of information about printer use states corresponding to resource information such as operating states, functions, expendables used, and the like of the printers 105 to 108, is executed on the basis of the application attribute information 1405 sent from the printer driver 1401, and the processing result is stored in a department management information database 1410 to update its contents.

In the print accounting process of this embodiment, information stored in the logging/cost information database 1408 includes the use time upon using the application, unit cost information such as a document data size generated, and unit cost information associated with expendable use states such as a paper size, the number of sheets including the number of copies, paper type, the presence/absence of use of staples, color/monochrome print mode, and the like used in a document print process. The logging/accounting process 1409 executes an accounting calculation process for respective departments such as personal users, groups, affiliations, and the like, who use the application to make a document print process, and undergo an accounting process, and stores the processing result in the department management information database 1410 as an accounting result to update the contents of the database 1410.

Example of Control Processes in Client/Print Server and Server

Figure 15:
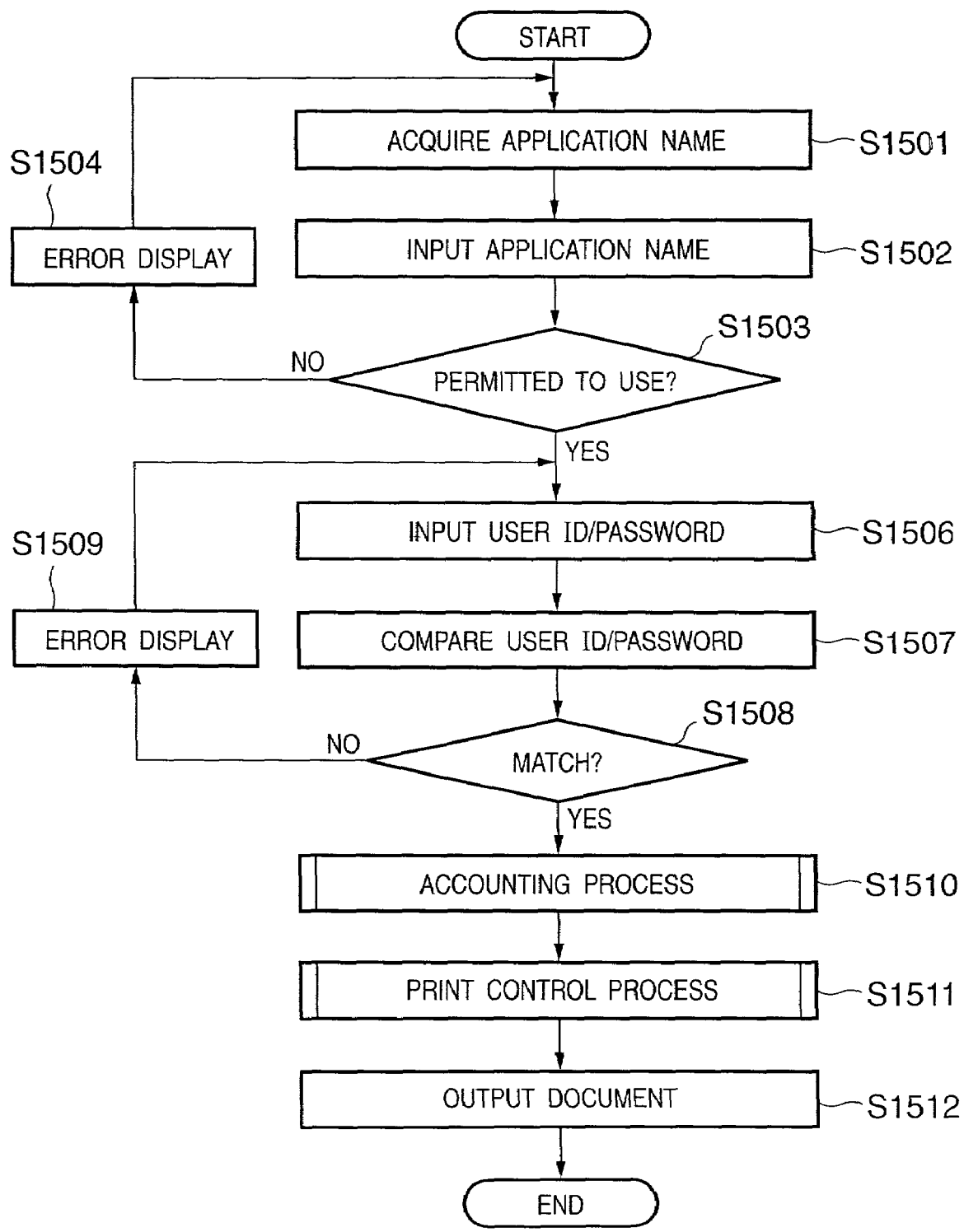
FIG. 15 is a flow chart showing respective control processes in a client/print server and server of the third embodiment.

Respective control process in the clients 102 to 104 or print server 101 and the server 100 in the third embodiment will be described in detail below using the flow chart shown in FIG. 15.

In step S1501, the printer driver 1401 acquires the application name used via an application program interface (API) of the operating system or by preparing and using application program interfaces (API) prescribed by the application 1400 and printer driver 1401 in case of a dedicated application.

In step S1502, the acquired application name is input and sent to the server 100. It is checked in step S1503 by the user authentication process 1407 on the server 100 on the basis of the application use right information of the user of interest if that user can use the application. If it is determined that the use cannot use the application, an error message is displayed in step S1504, and the flow returns to step S1501.

If it is determined that the user can use the application, a user ID and password are input manually by the user or automatically based on attribute information of a document to be printed generated by the application 1400, and are sent to the server in step S1506 as a user authentication request, so as to make user authentication on the server 100. The input user ID and password are compared with information used in user authentication contained in the print job data in step S1507, thus executing a user authentication process.

If it is determined based on the authentication result in step S1508 that the user ID and password match the information, i.e., if it is determined that authentication has succeeded and the job is printable, the control enters the subsequent authentication/accounting process and print process. On the other hand, if the user ID and password do not match the information, an error message is displayed in step S1509 to prompt the user to re-input a user ID or password.

If it is determined in step S1508 that the job is printable, calculation and accounting processes of application and printer use states for each department such as a personal user, group, affiliation, or the like are executed.

A print control processor (module) in step S1511 executes an image output control process to output a document (S1512).

As described above, according to the third embodiment, an accounting process of the use time of the application, the document data size to be generated and printed, and the like is done for respective departments upon using an application by checking the right/permission of use of the application, thus providing an automatic authentication system that can achieve the object of the present invention.

Note that the present invention is also achieved by supplying a storage medium, which records a program code of a software program that can implement the functions of the above-mentioned embodiments to a system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

Note that the present invention can also be applied to a case wherein a program is delivered from a storage medium that records a program code of software which implements the functions of the above embodiments to the user who issued a request via a communication line such as personal computer communications.

According to the present invention, an automatic authentication method and system in a print process, which can obviate the need for user's input operations of the user ID and password and can improve security since authentication is automatically done based on print information embedded in a file or information from an application program without any user's input, can be provided.

That is, since authentication is automatically done based on file attributes, the user need not be troubled about authentication data and the like.

No password need be given to the user, and an authentication restriction can be set for the file itself. If a password is given to the user and is managed by himself or herself upon user authentication, it may be leaked to a third party. However, the present invention can solve this problem.

For example, upon making accounting management for respective departments in association with print processes by a printer, in a print accounting process for cost for expendables in print processes and cost for the use time of the printer, user authentication is automatically done on the basis of various kinds of document attribute information such as a document name, application name, document creator or updater, affiliation of the document creator or updater, password, create/update date, and the like from an application that creates and outputs a document, thus maintaining high security and improving operability upon authentication.

For example, upon executing a secured print process by a printer, information required for user authentication is sent from a printer driver on the basis of various kinds of document attribute information such as a document name, application name, document creator or updater, affiliation of the document creator or updater, password, create/update date, and the like, which are output from an application that issues a document print instruction and are associated with a document to be printed, and user authentication is automatically done, thus maintaining high security, and improving operability by obviating the need for user operations associated with user authentication.

For example, upon making accounting management for respective departments in association with print processes by a printer, in a print accounting process for cost for expendables in print processes and cost for the use time of the printer, user authentication is automatically done on the basis of various kinds of application attribute information such as an application name, application user, affiliation of the application user, password, use date, and the like that pertain to an application which creates and outputs a document, thus maintaining high security and improving operability upon authentication. In addition, calculation and accounting processes of application and printer use states can be made for respective departments such as personal users, groups, affiliations, and the like.

As many apparently widely different embodiments of the present invention can be made without departing from the spirit and scope thereof, it is to be understood that the invention is not limited to the specific embodiments thereof except as defined in the appended claims.

What is claimed is:

1. An authentication method in a print process that requires authentication, wherein said print process is executed by a printer driver in a client apparatus, said method comprising the steps of:

obtaining, from electronic data for which an instruction to print has been issued, information identifying an application which issued the instruction to print the electronic data, wherein said information is obtained by using an application interface (API) for the printer driver;

executing an authentication request for approving an output process of the electronic data based on the information identifying the application; and controlling the print process so as to permit execution of a generation of print data, using the printer driver, from the electronic data and from the output process, in response to a success of the authentication, and controlling the print process so as to stop execution of the generation of print data, using the printer driver, from the electronic data, in response to a failure of the authentication.

2. The method according to claim 1, further comprising a step of extracting attribute information including the information identifying the application from the electronic data, and wherein the attribute information contains various kinds of document attribute information including at least one of a document name, application name, document creator/updater, affiliation of the document creator/updater, password, create/update date, which are associated with a document print process.

3. The method according to claim 1, further comprising the step of executing, when authentication has succeeded and a print process is executed, an accounting process of expendables associated with the print process for each user or each department of a group to which a user belongs.

4. The method according to claim 2, wherein the attribute information contains various kinds of application attribute information including at least one of an application name, application user, affiliation of the application user, password, use date, which are associated with the application used.

5. The method according to claim 1, further comprising the step of executing, when authentication has succeeded and a print process is executed, an accounting process associated with use of the application for each user or each department of a group to which a user belongs.

6. The method according to claim 2, wherein authentication is executed by comparing an ID and password found based on the attribute information, and an ID and password that a user inputs to a printer.

7. An authentication system in a print process that requires authentication, wherein said print process is executed by a printer driver in a client apparatus, said system comprising:
   means for obtaining, from electronic data for which an instruction to print has been issued, information identifying an application which issued the instruction to print the electronic data, wherein said information is obtained using an application interface (API) for the printer driver;
   means for executing an authentication request for approving an output process of the electronic data based on the information identifying the application; and
   means for controlling the print process so as to permit execution of a generation of print data, using the printer driver, from the electronic data and from the output process, in response to a success of authentication, and for controlling the print process so as to stop execution of the generation of print data, using the printer driver, from the electronic data, in response to a failure of the authentication.

8. An information processing apparatus communicating with an external processing apparatus which performs an authentication for a print process executed by a printer driver in said information processing apparatus, comprising:
   extracting means for extracting, from electronic data for which an instruction to print has been issued, information identifying an application which issued the instruction to print the electronic data;
   output means for outputting the information extracted by said extracting means to said external processing apparatus in order to obtain the authentication for the print process based on the information; and
   control means for controlling the print process so as to permit execution of a generation of print data, using the printer driver, from the electronic data and from the output means, in response to a success of the authentication, and for controlling the print process so as to stop execution of the generation of print data, using the printer driver, from the electronic data, in response to a failure of the authentication,
   wherein said extracting means extracts the information identifying the application from the electronic data for which an instruction to print has been issued by calling the printer driver and an application interface (API) provided in the printer driver, and wherein said API exchanges data between the printer driver and an operating system that operates the electronic data in said information processing apparatus.

9. The apparatus according to claim 8, wherein said information further contains various kind of document attribute information including at least one of a document name, document creator, application of the document creator, create date which are associated with a document print process.

10. The apparatus according to claim 8, wherein said information further contains an application name indicating an application to be used.

11. The apparatus according to claim 8, wherein said extracting means calls said API in response to a print instruction inputted from the application.

12. A authentication method of an information processing apparatus communicating with an external processing apparatus which performs an authentication for a print process executed by a printer driver in said information processing apparatus, said method comprising:
   an extracting step of extracting, from electronic data for which an instruction to print has been issued, information identifying an application which issued the instruction to print the electronic data;
   an output step of outputting the information extracted by said extracting step to said external processing apparatus in order to obtain the authentication for the print process based on the information; and
   a control step of controlling the print process so as to permit execution of a generation of print data, using the printer driver, from the electronic data and from the output step, in response to a success of the authentication, and of controlling the print process so as to stop execution of the generation of print data, using the printer driver, from the electronic data, in response to a failure of the authentication,
   wherein said extracting step extracts the information identifying the application from the electronic data for which an instruction to print has been issued by calling the printer driver and an application interface (API) provided in the printer driver, and wherein said API exchanges data between the printer driver and an operating system that operates the electronic data in said information processing apparatus.

13. The method according to claim 12, wherein said information further contains various kind of document attribute information including at least one of a document name, document creator, application of the document creator, create date which are associated with a document print process.

14. The method according to claim 12, wherein said information further contains an application name indicating an application to be used.

15. The method according to claim 12, wherein in said extracting step, said API is called in response to a print instruction inputted from the application.

16. A computer-readable storage medium storing a computer-executable program for performing an authentication method of an information processing apparatus which communicates with an external processing apparatus performing an authentication for a print process executed by a printer driver in said information processing apparatus, said computer-executable program including:
   an extracting step of extracting, from electronic data for which an instruction to print has been issued, information identifying an application which issued the instruction to print the electronic data;
   an output step of outputting the information extracted by said extracting step to said external processing apparatus in order to obtain the authentication for the print process based on the information; and
   a control step of controlling the print process so as to permit execution of a generation of print data, using the printer driver, from the electronic data and from the output step, in response to a success of the authentication, and of controlling the print process so as to stop execution of the generation of print data, using the printer driver, from the electronic data, in response to a failure of the authentication, wherein said extracting step extracts the information identifying the application from the electronic data for which an instruction to print has been issued by calling the printer driver and an application interface (API) provided in the printer driver, and wherein said API exchanges data between the printer driver and an operating system that operates the electronic data in said information processing apparatus.

* * * * *